Sept. 20, 1966 R. S. SHARP ETAL 3,274,558

DIGITAL DATA PROCESSOR

Original Filed Jan. 3, 1961 14 Sheets-Sheet 1

INVENTORS.
RICHARD STANTON SHARP
DAN ALLAN NEILSON
JAMES RUSSELL BENNETT

BY Christie, Parker & Hale
ATTORNEYS.

Sept. 20, 1966 R. S. SHARP ET AL 3,274,558

DIGITAL DATA PROCESSOR

Original Filed Jan. 3, 1961 14 Sheets-Sheet 2

| STATE | F2 | F1 |
|---|---|---|
| 0 | 0 | 0 |
| 1 | 0 | 1 |
| 2 | 1 | 0 |
| 3 | 1 | 1 |

DIGITAL DATA PROCESSOR

Sept. 20, 1966 R. S. SHARP ETAL 3,274,558

DIGITAL DATA PROCESSOR

Original Filed Jan. 3, 1961 14 Sheets-Sheet 7

Sept. 20, 1966 R. S. SHARP ETAL 3,274,558

DIGITAL DATA PROCESSOR

Original Filed Jan. 3, 1961 14 Sheets-Sheet 9

| BEFORE CLOCK PULSE | | | | | AFTER CLOCK PULSE | | | | | | | | | | |
|---|---|---|---|---|---|---|---|---|---|---|---|---|---|---|---|
| PRO. STEP | C.C.A. -14 | F2 | F1 | C REG. -94 | T2 | T1 | Af -28 | Bf -26 | M.A.R.-16 H. | T. | U. | A OP REG. -30 | B OP REG. -32 | Cu1 | [illegible] REG. -18 |
| 1 | 0 | 0 | 0 | 1 | 0 | 0 | 0 | 0 | 0 | 0 | 0 | 0 | 0 | 0 | 1 |
| 2 | 2 | 0 | 0 | 2 | 0 | 1 | 0 | 1 | 0 | 0 | 0 | 0 | 1 | 0 | 1 |
| 3 | 1 | 0 | 0 | 3 | 0 | 1 | 2 | 1 | 0 | 0 | 0 | 0 | 1 | 0 | 1 |
| 4 | 8 | 0 | 0 | 3 | 0 | 1 | 2 | 1 | 0 | 0 | 4 | 0 | 1 | 0 | 1 |
| \| | 7 | 0 | 0 | 0 | 0 | 1 | 2 | 1 | 0 | 0 | 4 | 0 | 1 | 0 | 1 |
| ↓ | 6 | 0 | 0 | 2 | 0 | 1 | 2 | 1 | 2 | 0 | 4 | 0 | 1 | 0 | 1 |
| 5 | 6 | 0 | 1 | 5 | 1 | 1 | 2 | 1 | 0 | 0 | 0 | 0 | 5 | 0 | 1 |
| 6 | 5 | 0 | 0 | 0 | 1 | 1 | 2 | 1 | 0 | 0 | 2 | 0 | 5 | 0 | 1 |
| \| | 4 | 0 | 0 | 0 | 1 | 1 | 2 | 1 | 0 | 0 | 2 | 0 | 5 | 0 | 1 |
| ↓ | 3 | 0 | 0 | 2 | 1 | 1 | 2 | 1 | 2 | 0 | 2 | 0 | 5 | 0 | 1 |
| 7 | 3 | 0 | 1 | 8 | 1 | 1 | 2 | 1 | 0 | 0 | 0 | 8 | 5 | 0 | 1 |
| 8 | 11 | 0 | 0 | 5 | 1 | 1 | 2 | 1 | 0 | 0 | 7 | 8 | 5 | 0 | 1 |
| \| | 10 | 0 | 0 | 0 | 1 | 1 | 2 | 1 | 0 | 0 | 7 | 8 | 5 | 0 | 1 |
| ↓ | 9 | 0 | 0 | 2 | 1 | 1 | 2 | 1 | 2 | 0 | 7 | 8 | 5 | 0 | 1 |
| 9 | 9 | 1 | 1 | 3 | 1 | 0 | 1 | 0 | 2 | 0 | 7 | 0 | 0 | 1 | 1 |
| 10 | 9 | 1 | 0 | 3 | 1 | 0 | 1 | 0 | 0 | 0 | 0 | 0 | 0 | 1 | 1 |
| 4 | 8 | 0 | 0 | 3 | 1 | 0 | 1 | 0 | 0 | 0 | 3 | 0 | 0 | 1 | 1 |
| \| | 7 | 0 | 0 | 0 | 1 | 0 | 1 | 0 | 0 | 0 | 3 | 0 | 0 | 1 | 1 |
| ↓ | 6 | 0 | 0 | 2 | 1 | 0 | 1 | 0 | 2 | 0 | 3 | 0 | 0 | 1 | 1 |
| 5 | 6 | 0 | 1 | 6 | 1 | 0 | 1 | 0 | 0 | 0 | 0 | 0 | 6 | 1 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 6 | 3 | 0 | 0 | 2 | 1 | 0 | 1 | 0 | 2 | 0 | 1 | 0 | 6 | 1 | 1 |
| 7 | 3 | 0 | 1 | 7 | 1 | 0 | 1 | 0 | 0 | 0 | 0 | 7 | 6 | 1 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 8 | 9 | 0 | 0 | 5 | 1 | 0 | 1 | 0 | 2 | 0 | 6 | 7 | 6 | 1 | 1 |
| 9 | 9 | 1 | 1 | 4 | 1 | 0 | 0 | 15 | 2 | 0 | 6 | 0 | 0 | 1 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 6 | 3 | 0 | 0 | 0 | 1 | 0 | 0 | 15 | 2 | 0 | 0 | 0 | 0 | 1 | 1 |
| 7 | 3 | 0 | 1 | 1 | 1 | 0 | 0 | 15 | 0 | 0 | 0 | 1 | 0 | 1 | 1 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 8 | 9 | 0 | 0 | 5 | 1 | 0 | 0 | 15 | 2 | 0 | 5 | 1 | 0 | 1 | 1 |
| 9 | 9 | 1 | 1 | 5 | 1 | 0 | 15 | 15 | 2 | 0 | 5 | 0 | 0 | 0 | 1 |
| 10 | 9 | 1 | 0 | 2 | 1 | 0 | 15 | 15 | 0 | 0 | 0 | 0 | 0 | 0 | 1 |
| 11 | 15 | 0 | 0 | 2 | 0 | 0 | 0 | 0 | 0 | 0 | 0 | 0 | 0 | 0 | 0 |

FIG. 6.

| PROGRAM STEP | COMMAND CHARACTER REGISTER-14 | F2 | F1 | R1 | R2 | M8 | BUF. ADD. -97 | C REG.-34 | M.A.R. -16 U. |
|---|---|---|---|---|---|---|---|---|---|
| 5 OR | 6 OR | 0 | 1 | 1 | 0 | 0 | 0 | X | 0 |
| 10 OR | 9 OR | 1 | 0 | 1 | 0 | 0 | 0 | X | 0 |
| 11 | 15 | 0 | 0 | 1 | 0 | 0 | 0 | X | 0 |
| 12 | 5,11 OR 5,8,15, OR 0 | 0 | 1 | 1 | 1 | 1 | 0 | 0 | 0 |
| 13 | | 1 | 0 | 0 | 1 | 1 | 0 | 1 | 0 |
| 14 | | 1 | 0 | 0 | 1 | 0 | 1 | 3 | 0 |
| 6,8 OR 6,4,11 OR 1 | | 0 | 0 | 0 | 0 | 0 | 1 | X | 0 |
FIG. 7.
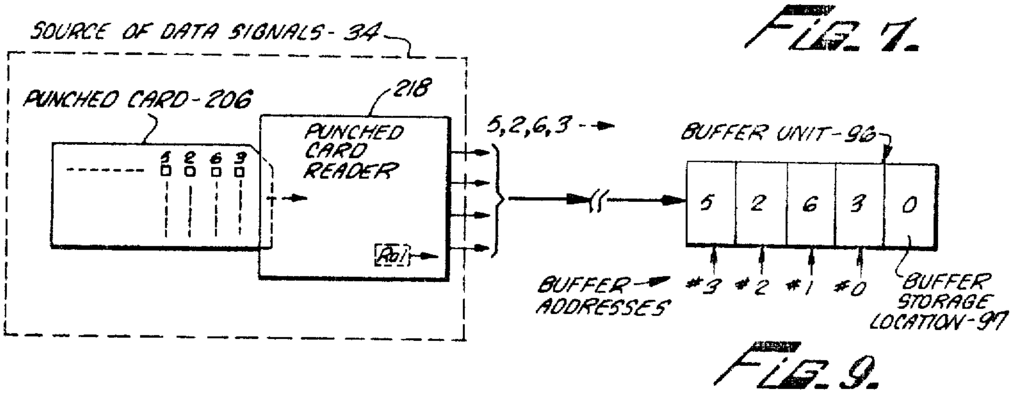
FIG. 9.
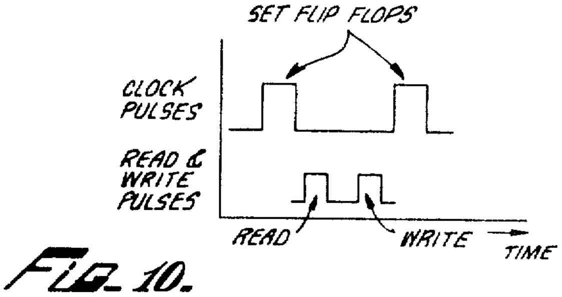
FIG. 10.

DIGITAL DATA PROCESSOR

United States Patent Office 3,274,558
Patented Sept. 20, 1966

3,274,558
DIGITAL DATA PROCESSOR

Richard Stanton Sharp, Sierra Madre, Calif., Dan Allan Neilson, North Palm Beach, Fla., and James Russell Bennett, Glendora, Calif., assignors to Burroughs Corporation, Detroit, Mich., a corporation of Michigan Continuation of application Ser. No. 80,171, Jan. 3, 1961. This application Oct. 19, 1965, Ser. No. 505,123
33 Claims. (Cl. 340—172.5)

This invention relates to computing machines and, more particularly, to digital data processors.

This case is a continuation of a previously filed application Serial No. 80,171, filed January 3, 1961 and now abandoned by the same inventors as this patent application.

Data processors are generally arranged for processing data at a relatively high rate of speed. The data processors have a single memory unit for storing commands and operands to be processed. To allow as short a computing or processing time as possible, data processors have been arranged so that one of the steps of the operation is bringing a full command out of a memory unit for storage in some type of intermediate command register. The command of a three-address data processor has two addresses of locations in the memory unit where two operands to be processed are stored, the address of a location in the memory unit where the result of the processing of the operands is to be stored and an order denoting the arithmetic operation to be performed on the operands. The next step of operation is to address the memory unit with the operand addresses and shift the operands out of the memory and store them in other intermediate or operand registers in accordance with the fetched command. The operands are then processed and finally the result is stored in the memory unit.

With such an arrangement there is a great duplication of storage apparatus. For example, four intermediate storage registers are needed for storing the three addresses and the order when actually only one of the addresses in a command is used for addressing the memory unit at any one point in time. Also many times only portions of operands are processed at a time and yet, the full operands are stored in the operand registers. Since only part of each operand is processed at a time, the rest of the operand could just as well be left in the memory unit until actually used. It should be noted that the memory unit in such an arrangement is addressed for reading and storing information only about ten percent of the total time. Thus, the memory unit is not used very efficiently.

Many banking systems use punched cards for storing information. This means that most of the input and output devices for a data processor in a banking system will be card readers, card punches and the like. Such input-output devices are relatively slow, compared with the higher speed electronic data processing machines mentioned hereinabove, causing processors to waste time waiting for the lower speed input and output devices to read processed data from the data processor and read information from punched cards, etc., for input to the data processor.

Data processors also are known which process variable length operand or data signals. Generally, such machines require special identification bits in the memory unit accompanying each variable length operand to designate length. Then when the operands are processed they are generally converted to fixed word length operands.

The present invention provides an improved data processor wherein the number of intermediate storage registers and the lengths thereof are kept to a minimum by shifting only parts of two operands out of the memory unit, processing those parts of the operands and storing the result in the memory unit before other parts of the operands are shifted out for processing. Also each operand is processed as a true variable length operand without the necessity of converting it to a fixed-length word. This is accomplished by handling all operands in characters composed of a fixed number of binary bits and by the use of special field length characters in each command to designate the number of characters in, or the length of, each operand. By handling variable field length operands in fixed length characters the data processor of this invention actually processes two fixed length numbers at a time, thereby providing a tremendous savings in registers and gating circuits, which otherwise would be needed for converting the full variable length operands to a fixed length word.

The present invention also provides an improved data processor which allows the execution of a command to be interrupted during the processing of each character of two operands. This allows one or more buffer units to be made a part of the main memory for use in storing new data characters from input units and shifting out processed data to output units. By this arrangement reading and writing in the buffer unit may be done using substantially the same address registers and, in a core memory unit, the same core driving circuits for the buffer unit as used for the memory unit. Also, by interrupting the processing for reading a new data character at a time from peripheral punched card readers, the peripheral card units may operate independently of the processor at their own speed, and yet allow each character of data to be read from the peripheral unit as presented thereby and stored in the special buffer unit. The data characters in the buffer unit may then be transferred to main memory under control of a separate data processing command. Thus, a data processor is provided whose actual processing speed is slower than conventional data processing machines. However, by the use of the special interrupt feature, the special buffer unit and operation by characters, the speed of the data processor is completely compatible with peripheral character oriented data units, and due to increased speed provided by the buffering units, the data processor is still faster than the fastest card read and card punch units available. This arrangement allows the cost of a data processor to be reduced to approximately one-half that of comparable prior art data processors, due to the savings in register circuits and buffer core driving circuits.

Briefly, a specific example of the present invention provides a character oriented data processor having a storage unit for storing binary coded digital operands and commands. The operands are composed of a variable number of characters, each of which is composed of a fixed number of binary bits. The commands are also composed of characters, and the characters of the commands along with the characters of the operands are stored in addressable storage locations of the storage unit. Each command contains the beginning addresses of a memory field where characters of two operands are stored, the beginning address of a memory field where characters of the result of the processing of the operands are to be stored, an order character for specifying the type of operation to be performed on the operands and two field length character for specifying the field length of each operand specified in the command. A command address register and a command character register provide the command address signals to the storage unit. The command register addresses the particular command being used and the command character register addresses the characters within the particular command in a prescribed order. A memory address register addresses operands in the storage unit causing the operands to be shifted out of the storage unit a character at a time. A processing unit is coupled to the storage unit. The processing unit is arranged for processing operands a character at a time and for adding field length characters to the beginning operand addresses as the addresses are shifted out of the storage unit so as to form addresses of the characters within each operand being processed. Two field length registers are provided for storing the two field length characters and are arranged for decreasing the magnitude of the field length characters in between processing of characters of operands so that when they are added to the beginning addresses of operands the resulting address is that of the next character to be processed. The addresses determined by the processing unit are stored in the memory address system.

A better understanding of the invention may be obtained with reference to the following detailed description of the drawings, of which:

FIG. 6 is a timing diagram illustrating the states of the flip-flop circuits and register circuits in the data processor of FIG. 2 when executing the exemplary command, step by step, of FIG. 4 on the operands of FIG. 5;

FIG. 7 is an exemplary timing diagram for the operation of the flip-flop circuits and registers in the data processor of FIG. 2 when new data characters are stored in the storage means;

Figure 2:
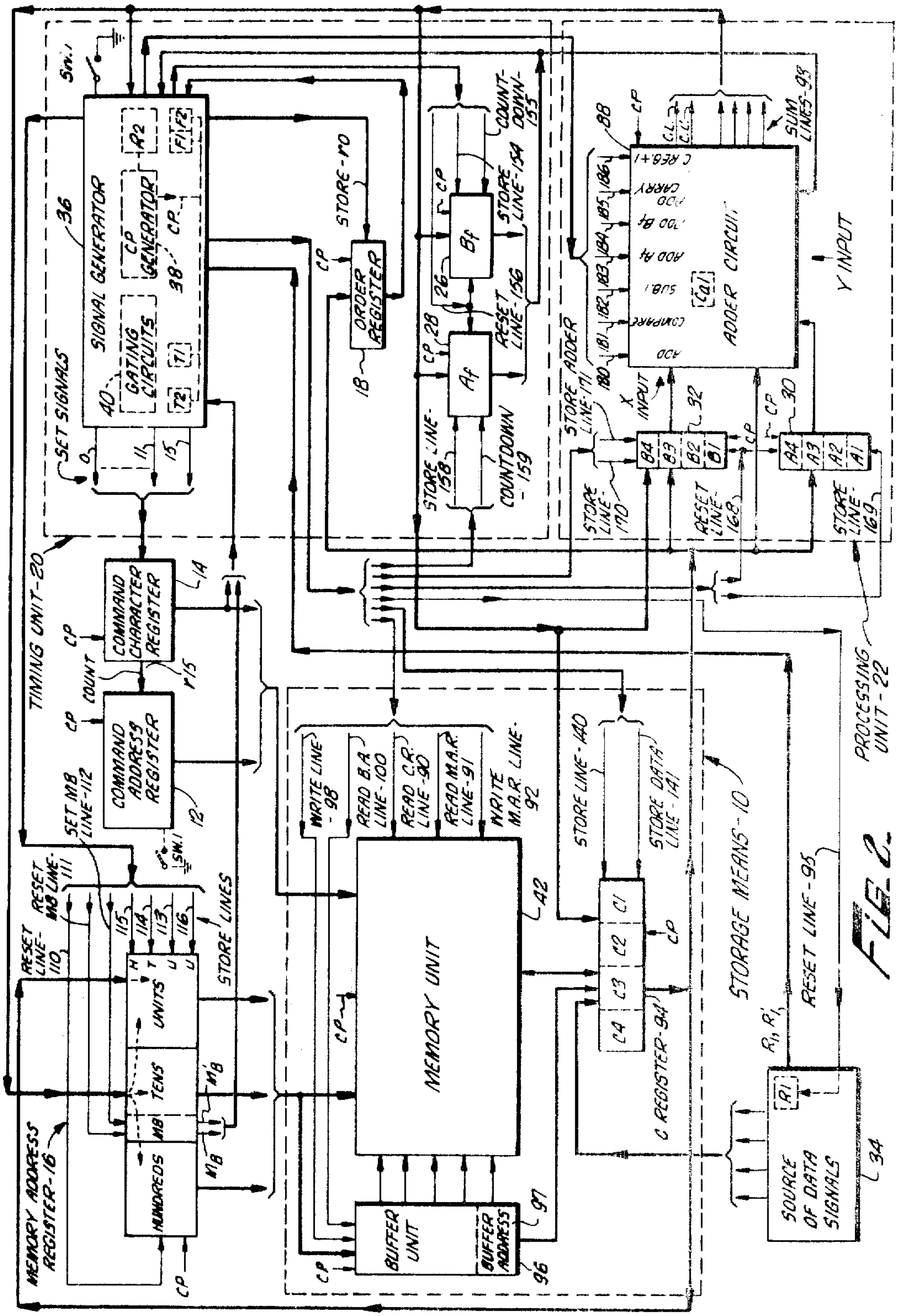
FIG. 2 is a detailed block diagram of the data processing system shown in FIG. 1.
Figure 3A:
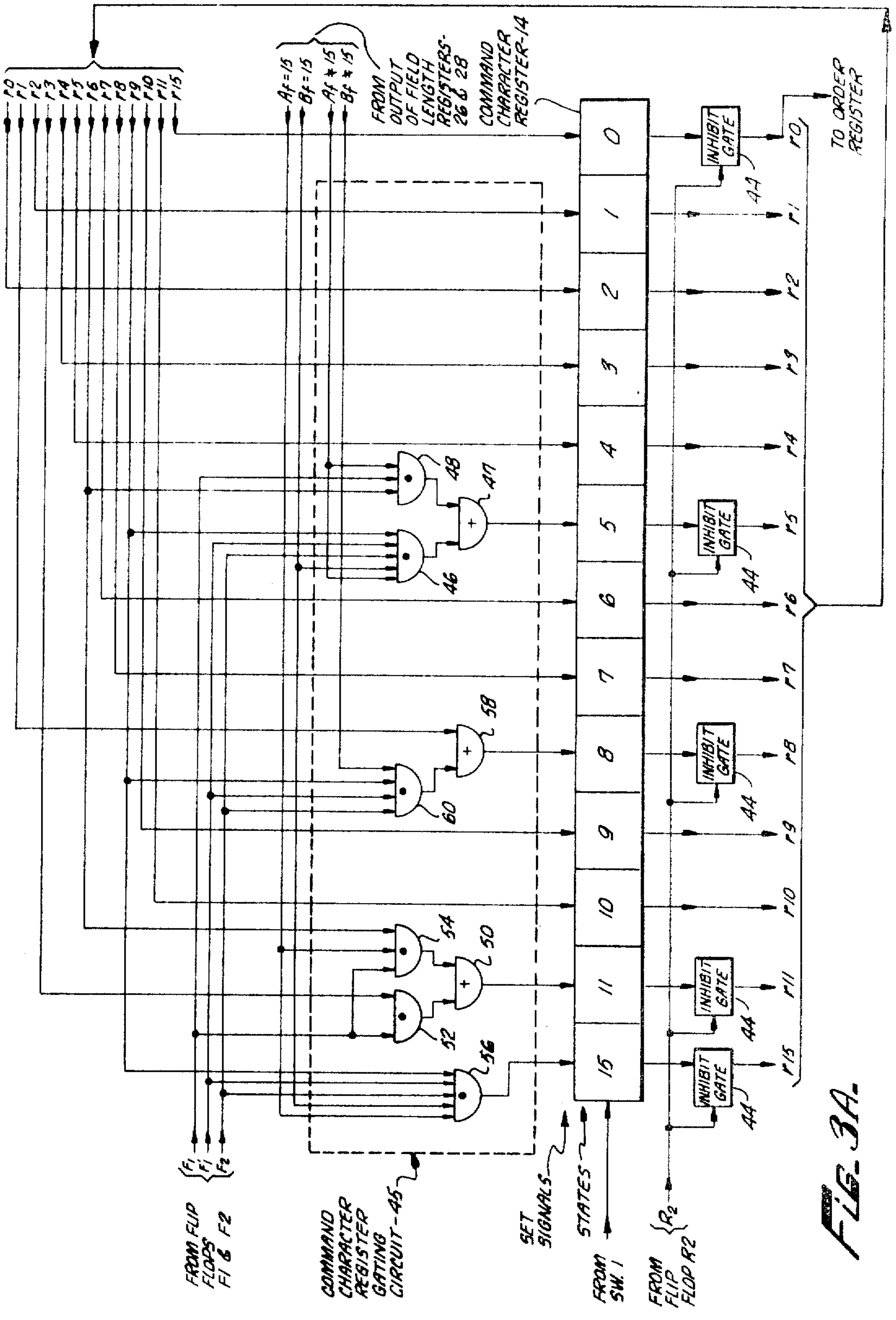
FIGS. 3A through 3M are detailed schematic diagrams of the gating circuits shown in FIG. 2.
Figures 3B, 11:
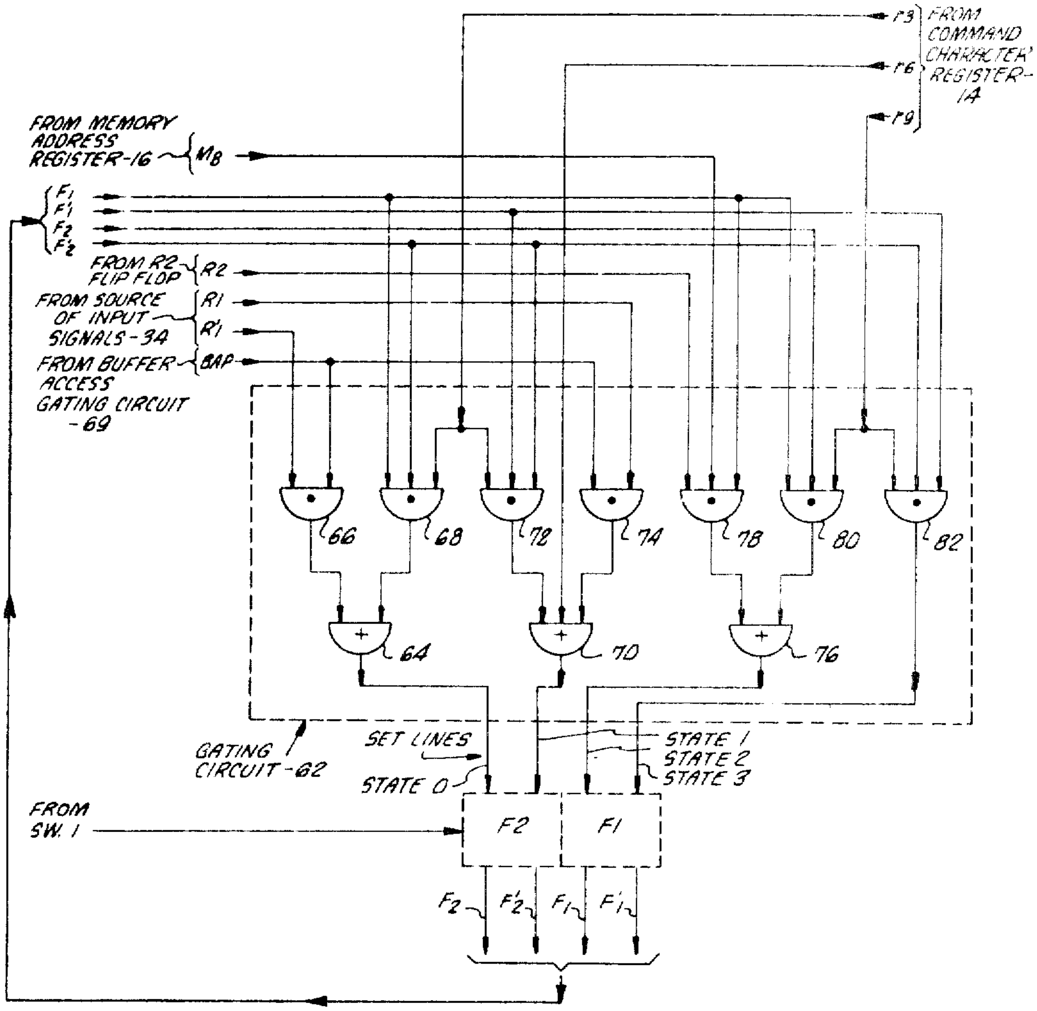
Figures 8, 8A, 8B:
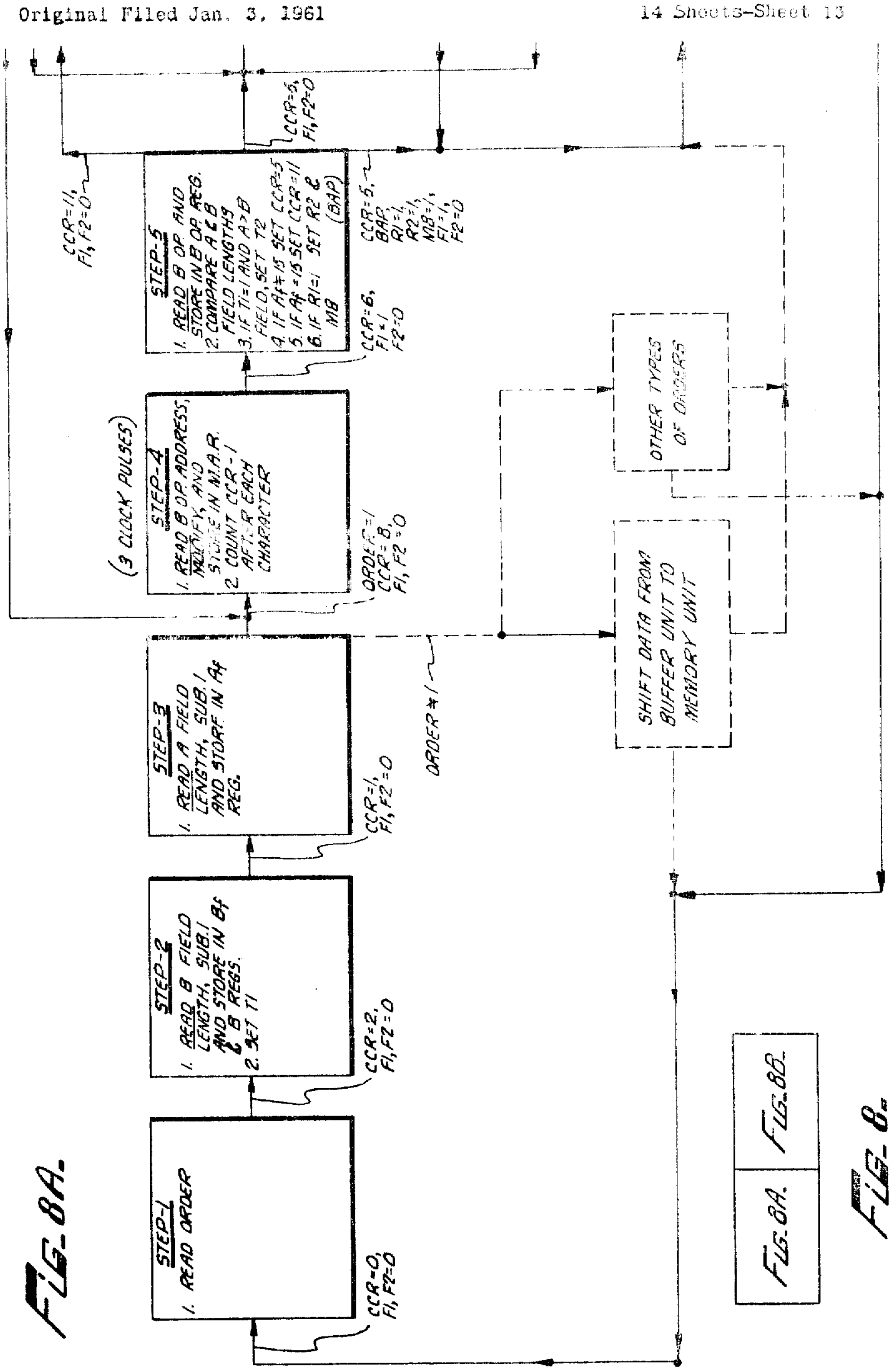
Figure 8B:
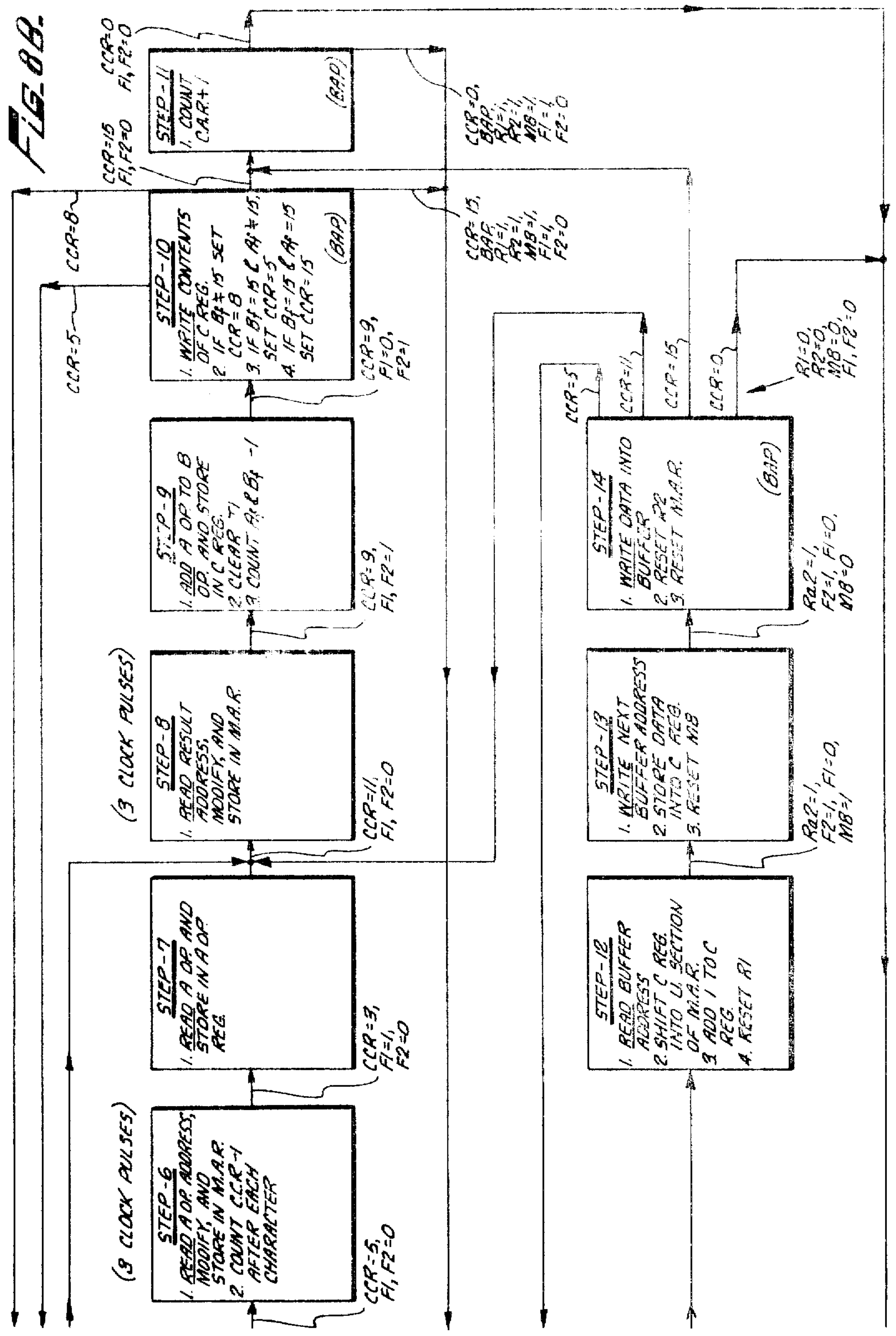

FIGS. 8A and 8B, taken together as shown in FIG. 8, comprise a flow chart illustrating the sequence of operation of the data processor of FIG. 2;

FIG. 9 is a partial block diagram and partial functional diagram showing an example of data characters being shifted out from the source of data signals and stored in the buffer unit of the storage means;

FIG. 10 is a diagram illustrating the sequence of the reading and writing pulses for the memory unit and its associated buffer unit, and;

FIG. 11 is a diagram showing the representative states of operation of the register consisting of the flip-flops F1 and F2 corresponding to their binary digit representations.

Figure 1:
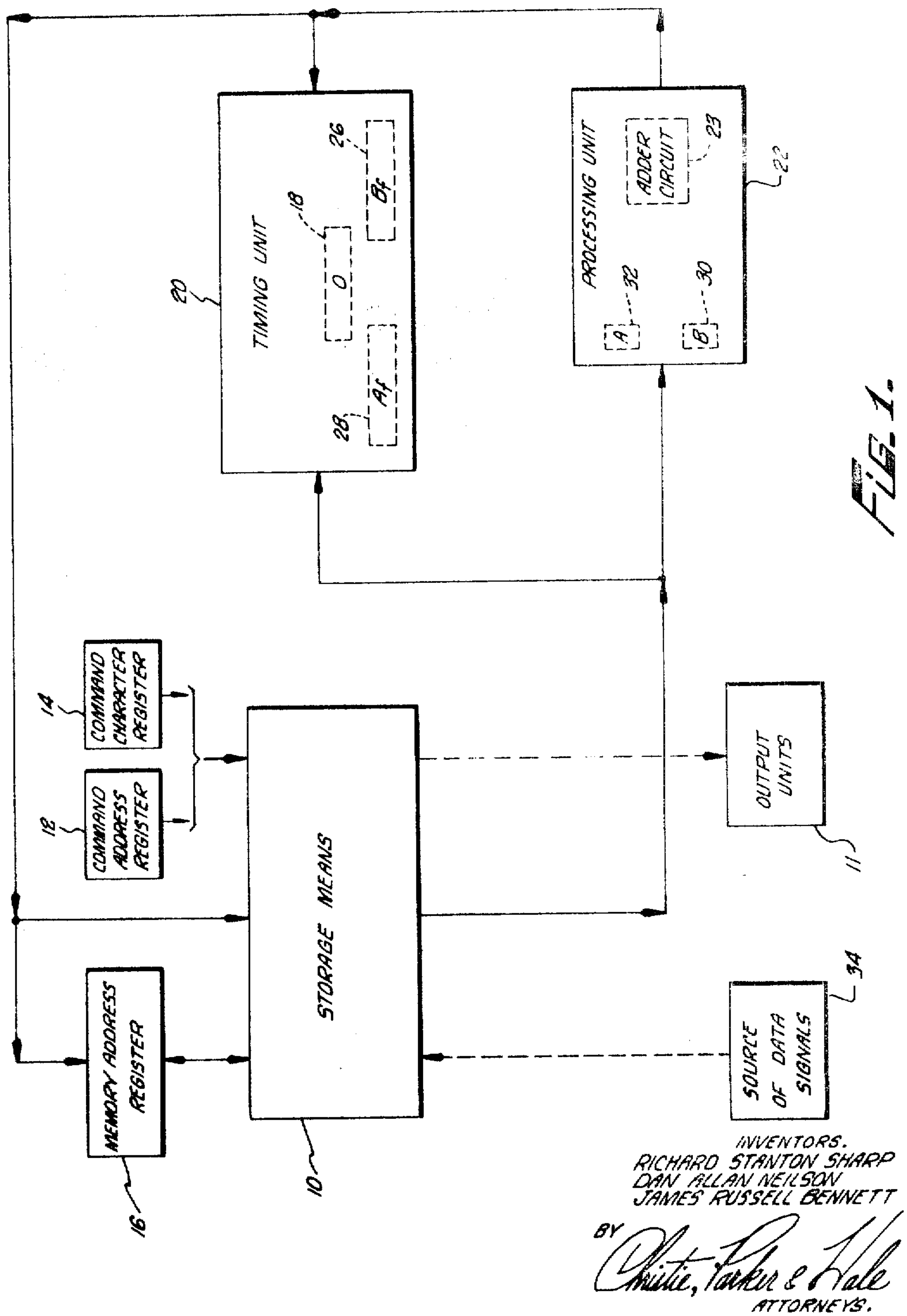
FIG. 1 is a general block diagram of a data processing system embodying the present invention.

Referring now to FIG. 1, a general block diagram of the adding system portion of a data processor is shown having a storage means 10 for storing commands and operands, composed of characters which are to be processed, edited and finally shifted out to peripheral output units 11. The storage means 10 contains individually addressable storage locations each of which is arranged for storing a single character of information. One or more of these storage locations will be referred to as operand and result fields for storing the variable length operands and the results of the processing of the operands. Each character of information is composed of a fixed number of binary coded digital signals.

The storage means 10 receives address signals from a command address register 12, a command character register 14 and a memory address register 16. The address signals developed by the command address register 12 specify a group of storage locations in the storage unit 10 which contain the particular command to be executed. The command character register 14 develops address signals for specifying the locations of particular characters within the specified command.

Figure 4:
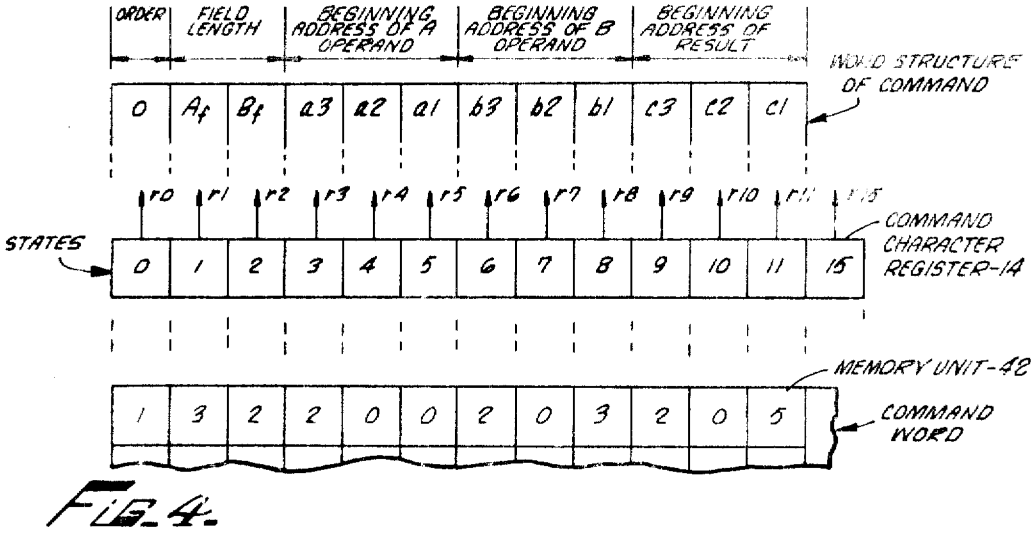
FIG. 4 is a diagram illustrating the word structure of the commands used in the data processing system of FIG. 2 and an example of a typical command word.

To be explained in more detail hereinafter, for the present it should be noted that each command has 12 characters. Referring to FIG. 4, it will be seen that one of the characters specifies the order or type of operation to be performed on the operands, two of the characters are field length characters and specify the length of the field of the two operands, six of the characters specify the beginning addresses of two operands and three of the characters specify the beginning address of the field where the characters of the result of the process on the operands are to be stored.

The first character of the command to be addressed by the command character register 14 is the order character which is shifted out of the storage means 10 and stored in an order register 18 (indicated by dashed lines) in a timing unit 20. Next, the command character register 14 addresses the storage locations storing the two field length characters which will be called the A and B field length characters, $A_f$ and $B_f$. The A and B field length characters are then individually shifted out of the storage means 10 and into the input circuit of a processing unit 22. The processing unit 22 has an adder circuit 23 which decreases the magnitude of the A and B field length characters by one, as shifted out of the storage means 10. The modified field length characters are then stored in A and B field length registers 28 and 26 (indicated by dashed lines) in the timing unit 20.

To be explained in detail, the magnitude of the addresses of the storage locations in the storage means 10 increases in magnitude, while the order of the characters of the operands stored in those storage locations decreases. Thus, the beginning address of an operand field is the address of the storage location of the most significant character of the operand. Thus, when the length of an operand field is decreased by one and added to the beginning address of the operand field, the address of the least significant character of the operand is obtained.

The operation at this point is dependent on the type of order stored in the order register 18. Assume that the order character stored in the order register 18 specifies that the two operands identified by the beginning operand addresses are to be added together with the magnitude of the A and B field length characters decreased by one and the result stored in the field length registers 26 and 28, the command character register 14 addresses the storage locations containing the three characters of the beginning address of the B operand. The three characters of the beginning address of the B operand are shifted out of the storage means 10 and into the processing unit 22. The processing unit 22 adds the modified B field length character in the field length register 26 and the resultant B operand address is stored into the memory address register 16. The memory address register 16 now contains the address of the least significant character of the B operand. The storage means 10 is now addressed by the memory address register 16 and the least significant character of the B operand is now shifted out of the storage means 10 and stored in the B operand register 30 (indicated by dashed lines) in the processing unit 22.

The command character register 14 now addresses the storage locations containing the three characters of the beginning address of an A operand. The storage means 10 now shifts out the three characters of the beginning address of the A operand. The processing unit 22 adds the modified A field length character to the beginning address of the A operand and the result is stored in the memory address register 16. Similar to that for the B operand the storage means 10 is again addressed by the command character register 14 and the least significant character of the A operand is shifted out of the storage means 10 and stored into an A operand register 32.

With the A and B operands stored in the operand registers 30 and 32 of the processing unit 22, the command character register 14 now addresses the three characters of the beginning address of the result field. The three characters of the result address are shifted out of the storage means 10 and into the processing unit 22. The processing unit 22 modifies the beginning address of the result field by adding to it the larger of the modified A and B field length characters, stored in the field length registers 26 and 28. The modified beginning address of the result field is the address of the result field where the least significant character of the result will be stored. The modified beginning address of the result field is then stored in the memory address register 16.

The processing unit 22 now combines the operands stored in the A and B registers 30 and 32 and a partial sum character representing the sum is applied at the input of the storage means 10 by the processing unit 22. This is the least significant partial sum character. The memory address register 16 then addresses the storage means 10 and the least significant partial sum character is stored in the addressed storage location of the storage means 10. Also, the modified field length characters in the field length registers 26 and 28 are decreased by one.

With the result of the processing of the first character of the two operands stored, the storage means 10 is again addressed by the command character register 14 and shifts out the beginning address of the B operand. The processing unit 22 now adds the new modified B field length character, stored in the register 26, to the beginning address of the B operand and the result is stored again in the memory address register 16. The modified address stored in the memory address register 16 is now the address of the next to the least significant character of the B operand. The storage means 10 is again addressed by the memory address register 16, and the next to the least significant character of the B operand is shifted out and stored in the processing unit 22.

Similarly, the beginning address of the A operand is again shifted out, modified and stored in the memory address register 16. Subsequently, the contents of the memory address register 16 is used to address the storage means 10 and the next to the least significant character of the A operand is shifted out and stored in the A operand register 32. The command character register 14 again addresses the memory locations containing the beginning address of the result field. This result address is shifted out, modified by the larger of the two modified field length characters in the registers 26 and 28 and the modified result address again is stored in the memory address register 16. The modified result address is now the address of the result field for storing the next to the least significant sum character. The two operand characters in the processing unit 22 are now combined similar to the first characters of the operands and a character representing the sum stored into the storage means 10. The magnitude of the two modified field length characters stored in the registers 26 and 28 are again decreased by one.

This sequence of operation is repeated until the contents of both the field length registers 26 and 28 have been counted down to an initial state. At this point the two operands are completely combined and the sum stored in the result field of the storage means 10. The command address register 12 then addresses the next command and the operation specified by the new order is executed.

It should be noted that a carry from the addition of two operand characters is combined with the addition of the next most significant characters. To this end, a flip flop circuit (flip-flop *Cal* shown in FIG. 2) is provided in the adder circuit 23 for providing an indication of a carry from a previous addition. A source of data signals 34 is also connected to the storage means 10 for supplying new data signals or characters of digital signal information. The source of data signals 34 may be a punched card reader or the like which repeatedly supplies data signals or characters to the storage means 10 a character at a time at a speed determined by its internal operating speed. To be explained in detail in the following description, the above described sequence of operation of the processor itself is interrupted during the processing of each character of the operands so that the storage means 10 may read and store the character of information presented by the source of data signals 34, before the character of data is lost.

Having the general operation of the data processor of FIG. 1 in mind, a brief description of terminology to be used in the following detailed description of figures will be given. Flip-flop circuits will be referred to by capital letters, followed by a number, i.e., T1, R1, etc. Each flip-flop circuit has two output circuits which will be referred to by the letter designation of the flip-flop followed by the number subscript of the flip-flop. To distinguish between output circuits, one of the output designations will have a prime affixed; thus, $T_1$, $T_1'$, $R_2$, $R_2'$, etc. Flip-flop circuits have two states of operation which will be referred to as the true and false states, or by saying the flip-flop circuits represent a digit 1 and digit 0, respectively. When a flip-flop circuit represents a digit 0, the primed output circuit is at a high potential level, and the unprimed at a low potential level. If the flip-flop circuit represents a digit 1, the primed output circuit is at a low potential level and the unprimed output circuit is at a high potential level. In the following discussion flip-flop circuits will be said to be "set" when triggered to represent a digit 1 and "reset" when triggered to represent a digit 0.

Gating circuits are used to control the triggering of flip-flop circuits into their states of operation. In the following description, each of the flip-flop circuits, and register circuits as well, will be understood to be triggered or set to different states only at the occurrence of a clock pulse signal, unless otherwise stated, whenever the corresponding input control, from, for example, a gating circuit, is at a high potential level.

With the general description of FIG. 1 in mind, a detailed description will be given of the data processor system of FIG. 1 shown in detail in FIG. 2. The timing unit 20 contains a signal generator 36. The signal generator 36 contains five timing flip-flops indicated by the symbols T1, T2, F1, F2 and R2 (indicated by dashed lines). Also provided is a clock pulse generator 38. The clock pulse generator 38 has an output circuit CP at which rectangular recurring clock pulse signals are provided to each of the flip-flop circuits, the register circuits and the storage means 10 in the data processor of FIG. 2. The signal generator 36 also contains gating circuits indicated by the general symbol 40. The gating circuits 40 provide the gating or control signals to each of the flip-flop circuits, register circuits, the processing unit 22 and the storage means 10 in the data processor of FIG. 2, for controlling the states of operation thereof. Detailed circuit diagrams of the gating circuits 40 are shown in FIGS. 3A through 3M.

Before describing the gating circuits 40 in detail, a brief explanation will now be given of the word structure of the commands and the operands. The storage means 10 contains a memory unit 42 which is a coincident current magnetic core memory unit. The memory unit 42 has a plurality of separately addressable memory locations, each for storing a character of binary coded decimal digital information. For purposes of illustration, it is assumed that each character of information has four binary coded decimal bits and each of the memory locations in the memory unit 42 contain four core units for storing the four binary bits representative of each decimal character. Refer now to FIG. 4, where an illustration of the word structure of the command is shown. At the top of FIG. 4 a command is shown to consist of an order character, A and B field length characters, three characters for specifying the beginning address of an A operand, three characters for specifying the beginning address of a B operand and three characters for specifying the beginning address where the result of the process of the operands is to be stored. The lower portion of FIG. 4 is an example showing a typical command word stored in the memory unit 42. The characters of the command word in the memory unit 42 are aligned with the illustration of the command structure shown at the top of FIG. 4. At the left, an order character 1 is shown. An order character 1 specifies that an addition is to be performed on the two operands specified by the command. The beginning address of the A operand is 200. The A operand is three characters long. The beginning address of the B operand is 203 and the B operand is two characters long. The beginning address of the result field is 205. To be explained in the following discussion, the processor of FIG. 2 takes the longer of the two field length characters, which in this case would be the A field length character three, and uses this character as the length of the result field.

Figure 5:
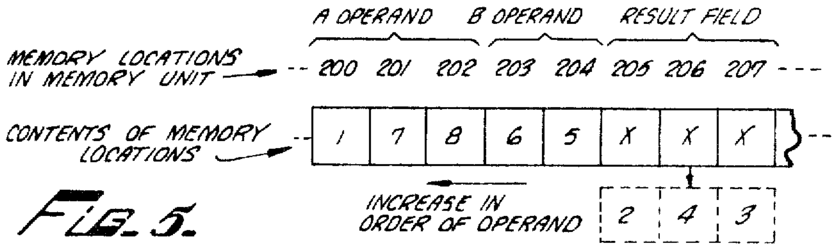
FIG. 5 is an example showing the contents of the memory locations needed for executing the exemplary command shown in FIG. 4.

FIG. 5 shows the contents of the memory locations specified by the A and B operands in FIG. 4 and the result field. The beginning address of the A operand is 200, and the length of the A operand is three characters, therefore, the A operand is the number 178. The beginning address of the B operand is 203 and the length of the B operand is two characters, therefore, the B operand is the number 65. The result field will then include the beginning address 205 and the addresses 206 and 207.

The command character register 14 receives set control signals for controlling its states of operation, from the output of the gating circuits 40. The command character register 14 develops coded output signals which are both address signals for the storage means 10 and timing signals for control of the gating circuits 40.

FIG. 3A shows the command character register 14 with its associated input circuits, which are designated 0 through 11 and 15, for receiving set signals for setting the register into various states of operation.

Gating circuits (not shown) are coupled between the input lines, bearing the set signals and flip-flop circuits (not shown), and are responsive to low potential set signals for setting the flip-flop circuits into corresponding representative states of operation. The command character register also has thirteen output lines designated *r*0 through *r*11 and *r*15, which correspond to the state of operation 0 through 11 and 15, respectively. Gating circuits (not shown) are also coupled between the flip-flop circuits and the output circuits for developing a high potential signal on an output line whenever the command character register is in the corresponding state of operation.

Five inhibit gates 44 are connected to the output circuits *r*0, *r*5, *r*8, *r*11 and *r*15 of the command character register 14. The inhibit gates 44 each have an input control circuit connected to the $R_2$ output circuit of the reader access timing flip-flop R2. Whenever the reader access flip-flop R2 represents a binary digit 1, or is in a true state, a high potential signal is developed at the control input of the inhibit gates 44, causing the inhibit gates 44 to block any high potential input signal and cause a low potential output signal regardless of the input signal thereto.

The command character register 14 has its thirteen input lines for receiving a set signal connected to a command character register gating circuit 45. The command character register gating circuit 45 has input circuits connected to the output circuits of the command character register 14, the flip-flop circuits F1 and F2 and the output circuits designated $A_f=15$, $A_f\neq15$, $B_f=15$ and $B_f\neq15$ of the A and B field length registers 28 and 26 (see FIG. 3I). The output circuits ***r*15, *r*2, *r*0, *r*4, *r*5, *r*7, *r*8, *r*10 and *r*11 are connected to the input circuits of the command character register 14 for setting the register into the states 0, 1, 2, 3, 4, 6, 7, 9 and 10, respectively. The input circuit for setting the command character register 14 into state 5 is connected to an output circuit of an "or" gating circuit 47, which has two input circuits. The two input circuits of the "or" gating circuit 47 are connected to output circuits of two "and" gating circuits 46 and 48. The "and" gating circuit 46 has five input circuits. Three input circuits of the "and" gating circuit 46 are connected to the output circuit *r*9 of the command character register 14 and the $F_1'$ and $F_2$ output circuits of the flip-flop circuits F1 and F2. The other two input circuits of the "and" gating circuit 46 are connected to the $B_f=15$ and the $A_f\neq15$ output circuits of the B and A field length registers 26 and 28**, respectively.

Figure 3D:
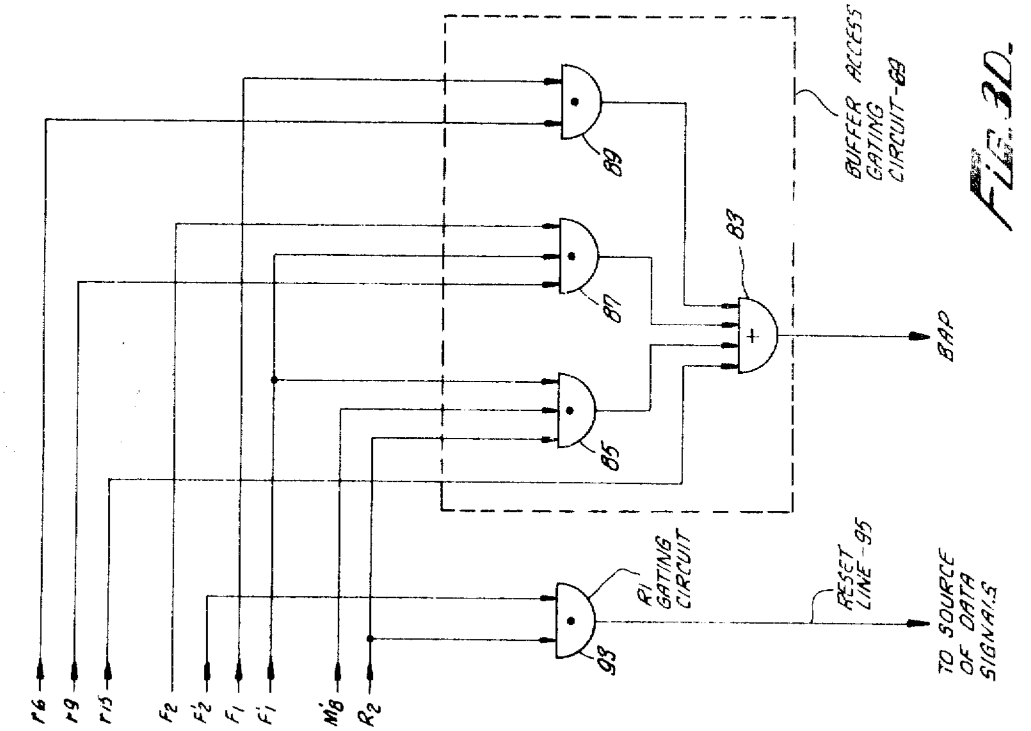
Figure 3C:
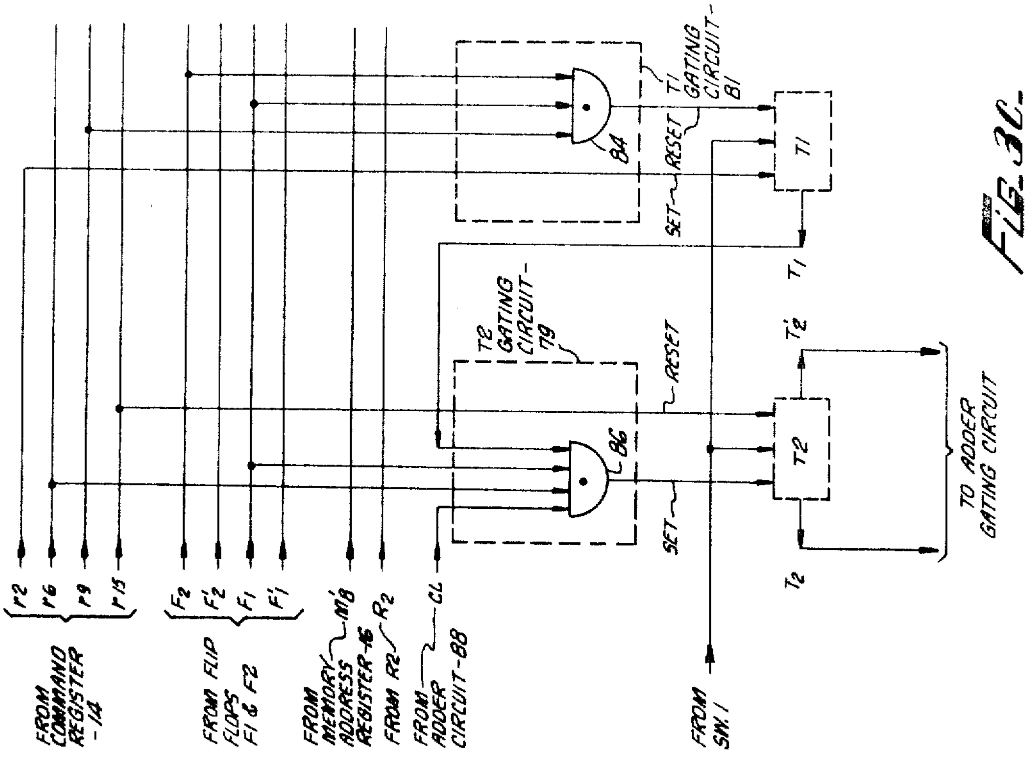
Figures 3E, 3G:
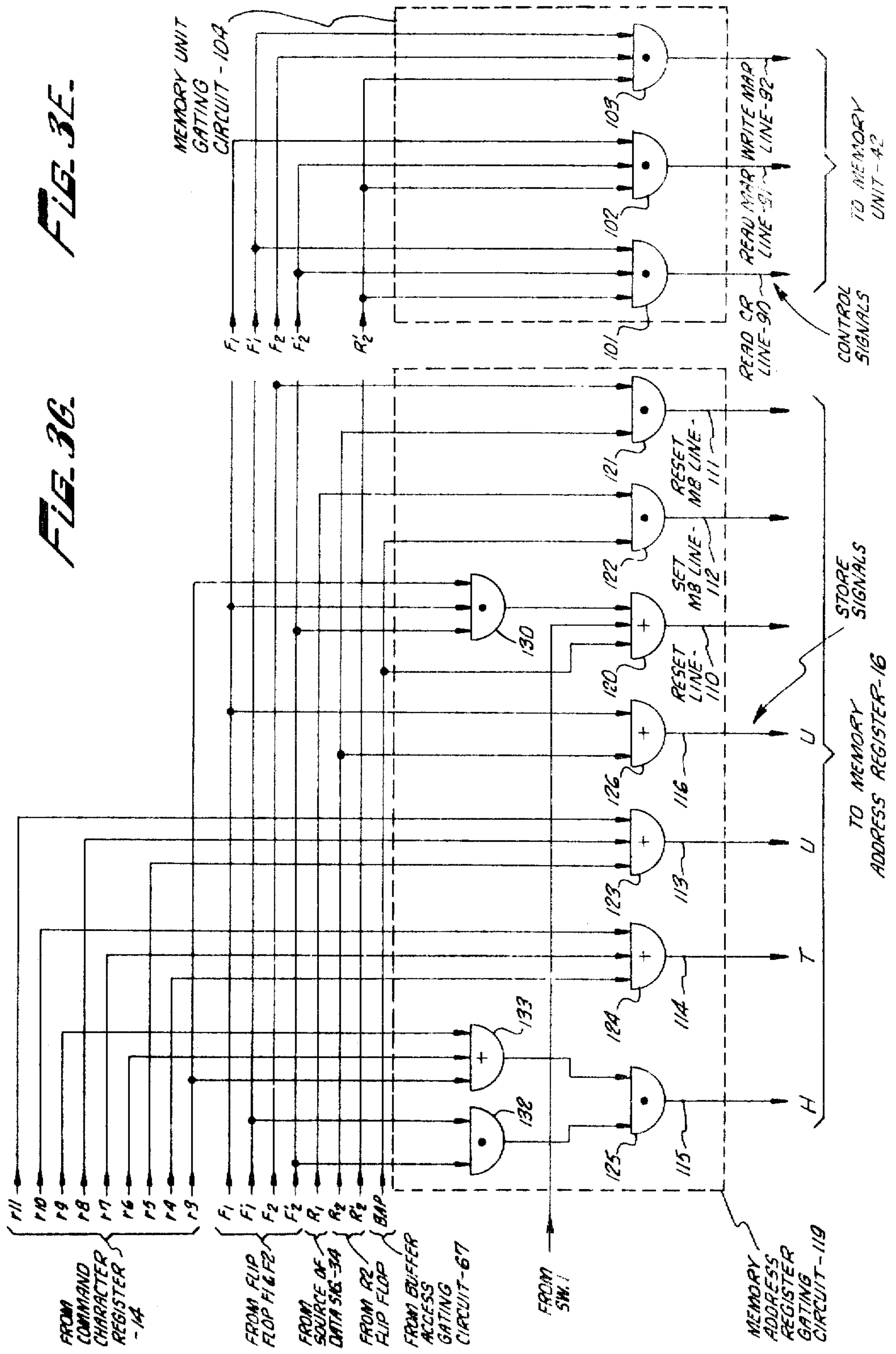
Figures 3F, 3L, 3M:
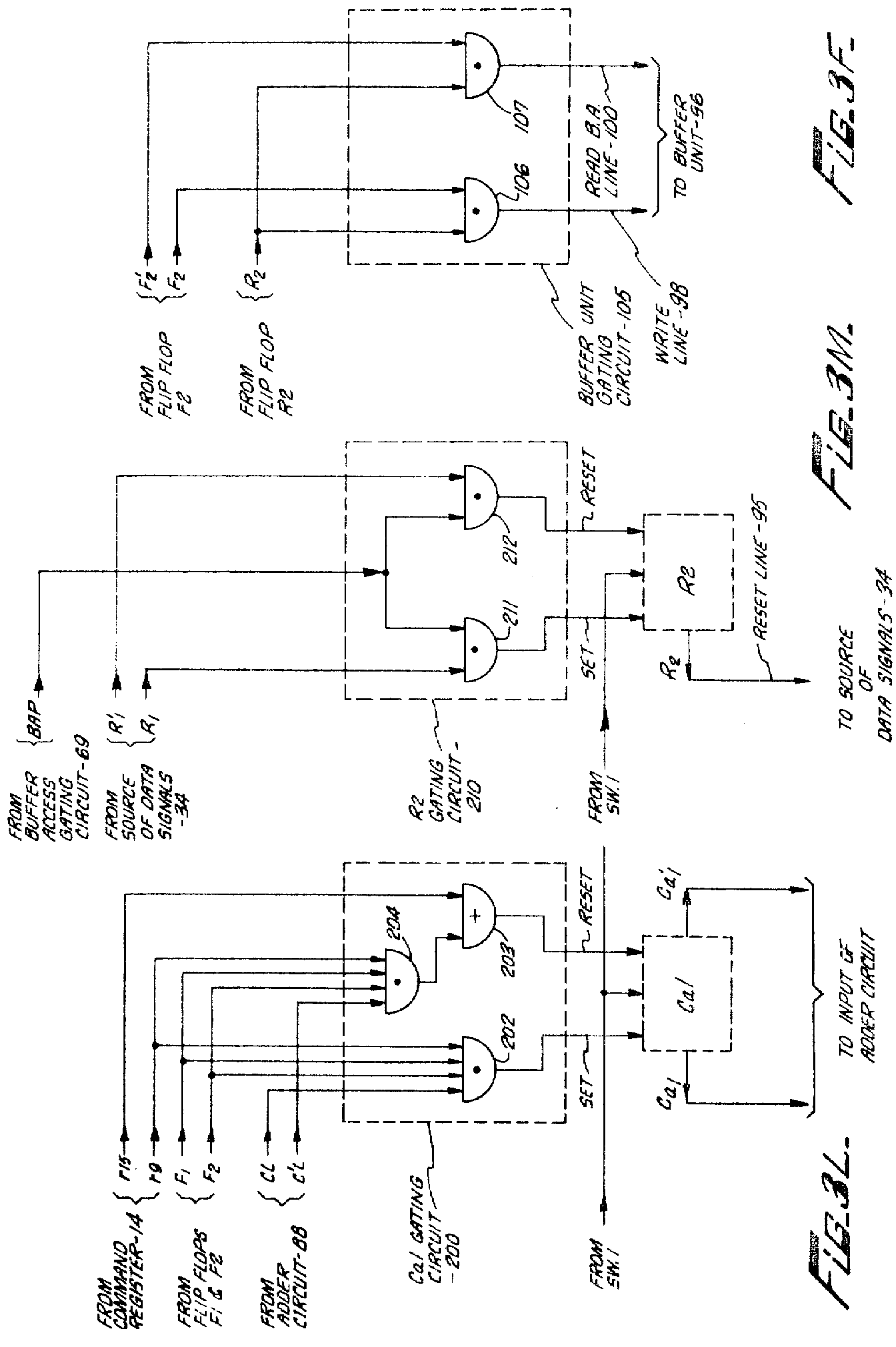
Figures 3H, 3I:
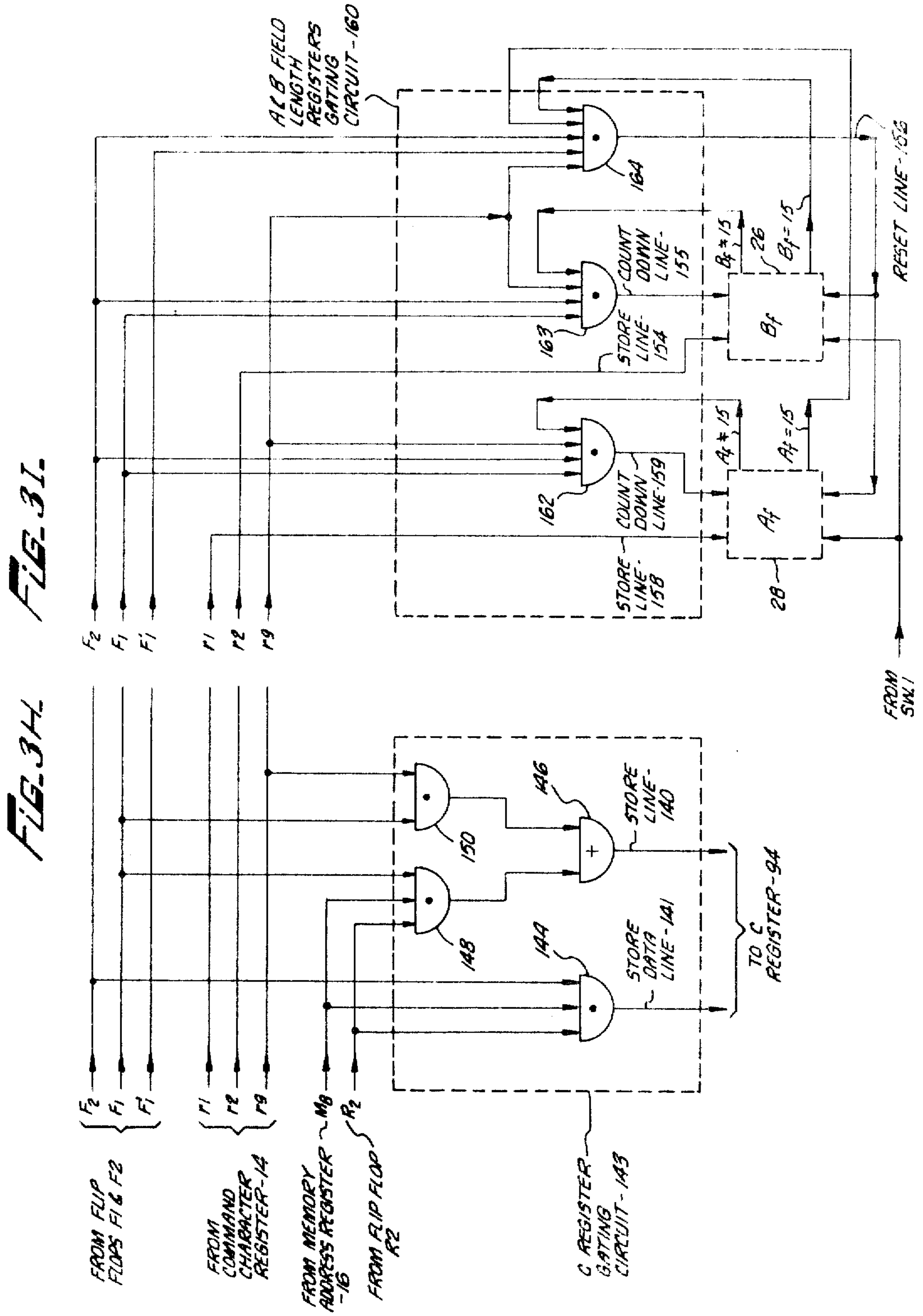

Referring to FIG. 3I, the B and A field length registers 26 and 28, respectively, are shown in dashed lines. The A field length register 28 has output circuits $A_f=15$ and $A_f\neq15$. Whenever the A field length register is storing a number equal to 15, the output circuit $A_f=15$ will be at a high potential level; at all other times it is at a low potential. Whenever the A field length register 28 is storing a number which does not equal 15, then the output circuit $A_f\neq15$ will be at a high potential level; at all other times the $A_f\neq15$ output circuit is at a low potential. Similarly, the B field length register 26 has output circuits $B_f=15$ and $B_f\neq15$, at which high potential signals are developed when a number stored therein is equal to 15 and is not equal to 15, respectively.

Referring again to FIG. 3A, the "and" gating circuit 48 has three input circuits. One input circuit is connected to the ***r*6 output of the command character register 14 and the other two input circuits are connected to the $F_1$ and the $A_f\neq15$ output circuits of the F1 flip-flop and the A field length register 28, respectively. The input circuit for setting the command character register 14 to state 5 is connected to the input circuit of an "or" gating circuit 58, which has two input circuits. The two input circuits of the "or" gating circuit 58 are connected to the *r*1 output circuit of the command character register 14 and the output circuit of an "and" gating circuit 60. The "and" gating circuit 60 has four input circuits. Two of the input circuits are connected to the output circuits *r*9 and $B_f\neq15$ of the registers 14 and 26, respectively, and the other two input circuits are connected to the output circuits $F_1'$ and $F_2$ of the F1 and F2 flip-flop circuits. The input circuit of the command character register 14, for setting it into state 11, is connected to an output circuit of an "or" gating circuit 50. The "or" gating circuit 50 has its input circuits connected to the output circuits of "and" gating circuits 52 and 54. The "and" gating circuit 52 has two input circuits which are connected to the *r*3 output circuit of the command character register 14 and the $F_1$ output circuit of the flip-flop circuit F1. The "and" gating circuit 54 has three input circuits which are connected to the *r*6 output circuit of the command character register 14, the $A_f=15$ output circuit of the A field length register 28 and the $F_1$ output circuit of the flip-flop circuit F1**.

The input circuit for setting the command character register 14 into state 15 is connected to an output circuit of an "and" gating circuit 56, which has five input circuits. The "and" gating circuit 56 has three of its input circuits connected to the output circuits ***r*9, $A_f=15$ and $B_f+15$ of the registers 14, 28 and 26, respectively. The other input circuits are connected to the output circuits $F_1'$ and F2 of the flip-flop circuits F1 and F2. A start switch Sw1 (see FIG. 2) is connected between the command character register 14 and ground (0 volt potential). Whenever it is actuated it resets the command character register 14** to state 0, regardless of its present state.

Having the structure of the command character register gating circuit 45 in mind, a brief explanation will now be given of its operation with reference to FIGS. 8A and 8B. FIGS. 8A and 8B form a flow chart which shows the sequence of operation of the processor of FIG. 2. At the beginning of each program step, the state of the command character register 14 is shown, which will give an indication of its sequence of operation in the following discussion. Whenever Sw1 is actuated, the following clock pulse signal will trigger the command character register 14 into state 0. With the command character register 14 in state 0, the following five clock pulse signals will trigger the command character register into states 2, 1, 8, 7 and 6. When the command character register 14 is in state 6, the following clock pulse signal will trigger it into state 5 if the contents of the A field length register 28 is not equal to 15, and it will be triggered into state 11 if the contents of the A field length register 28 is equal to 15. When the command character register 14 is in state 5, the following four clock pulse signals will trigger it into states 4, 3, 11 and 9, respectively. With the command character register in state 9, the following clock pulse signal will trigger it back into state 5 if the contents of the A field length register 28 is not equal to 15, the contents of the B field length register is equal to 15, and the flip-flop circuits F2 and F1 represent digits 1, 0. If, however, the contents of the B field length register is not equal to 15 and the flip-flop circuits F2 and F1 represent digits 1, 0, the following cock pulse will trigger the command character register 14 from state 9 to state 8. When both the contents of the A field length register 28 and the B field length register 26 are equal to 15 and the flip-flop circuits F2 and F1 represent digits 1, 0, the following clock pulse signal will trigger the command character register from state 9 to state 15. With the command character register 14 in state 15, the following clock pulse signal will trigger the command character register into state 0. It should be noted, however, that whenever the command character register 14 is in states 0, 5, 8, 11 and 15, the following clock pulse signal will not be effective to trigger it into the next state of operation, if the reader access flip-flop R2 represents a digit 1, since the inhibit gates 44 will inhibit the output signals of the command character register 14.

The $r15$ output circuit of the command character register 14 is connected to the count input circuit of the command address register 12. Whenever the command character register 14 is in state 15, the following clock pulse causes the command address register 12 to count to its next state of operation. The command character register continues, from an inhibit state, counting up to a preselected state where it counts back to the initial state of operation. The command character register is also connected to the start switch Sw1, which resets it to an initial state of operation when actuated.

With the command character register gating circuit 45 in mind, the gating circuit 62 for the flip-flop circuits F1 and F2 will now be described. The flip-flop circuits F1 and F2 have four possible representative states of operation, as shown in FIG. 11. With reference to FIG. 11, whenever both F1 and F2 are false, they are said to be in state 0. Also, whenever the flip-flop circuits F2 and F1 represent digits 0, 1, 1, 0 and 1, 1, respectively, the flip-flops F2 and F1 are said to be in the representative states 1, 2, and 3, respectively. The input circuit for setting the flip-flop circuits F1 and F2 into a 0 representative state is connected to the output circuit of an "or" gating circuit 64. The "or" gating circuit 64 has two input circuits which are connected to the output circuits of "and" gating circuits 66 and 68. The "and" gating cirucit 66 has its input circuits connected to the output circuit $R_1'$ of a flip-flop circuit R1 (shown by dashed lines) in the source of data signals 34 and an output circuit BAP of a buffer access gating circuit 69 shown in FIG. 3D. The "and" gating circuit 68 has three input circuits which are connected to the output circuit $r3$ of the command character register 14 and the output circuits $F_1$ and $F_2'$ of the flip-flop circuits F1 and F2. The input circuit for setting the flip-flop circuits F1 and F2 into a 1 representative state is connected to the output circuit of an "or" gating circuit 70. The "or" gating circuit 70 has three input circuits which are connected to the output circuits of "and" gating circuits 72 and 74, and the $r6$ output circuit of the command character register 14. The "and" gating circuit 72 has three input circuits which are connected to the output circuit $r3$ of the command character register 14 and the output circuits $F_1'$ and $F_2'$ of the flip-flop circuits F1 and F2. The "and" gating circuit 74 has two input circuits which are connected to the output circuit BAP of the buffer access gating circuit 69 and the $R_1$ output circuit of the flip-flop circuit R1. The input circuit of the flip-flop circuits F1 and F2 for setting it into a state 2 is connected to an output circuit of an "or" gating circuit 76. The "or" gating circuit 76 has two input circuits which are connected to the output circuits of "and" gating circuits 78 and 80. The "and" gating circuit 78 has three input circuits. The three input circuits are connected to the output circuits $R_2$ and $F_1$ of the flip-flop circuits $R_2$ and $F_1$, and an $M_8$ output circuit of the memory address register 16. Referring to FIG. 2, the $M_8$ output circuit of the memory address register 16 is the output of a flip-flop circuit M8 (indicated by dashed lines) contained therein. The input circuit of the "and" gating circuit 80 is connected to the $r9$ output circuit of the command character register 14 and the $F_1$ and $F_2$ output circuits of the flip-flop circuits F1 and F2. The input circuit for setting the flip-flop circuits F1 and F2 to state 3 is connected to an output circuit of an "and" gating circuit 82 which has three input circuits. The three input circuits are connected to the $r9$ output circuit of the command character register 14 and $F_1'$ and $F_2'$ output circuits of the flip-flop circuits F1 and F2. The flip-flops F2 and F1 are also connected to the flip-flops F1 and F2, for resetting them to a 0 representative state.

With the detailed description of the F1 and F2 gating circuit 62 in mind, a brief description of its operation will now be given. Referring again to the flow diagram of FIGS. 8A and 8B, an indication of the sequence of operation of the timing flip-flops F1 and F2 may be observed at the input to each of the program steps shown. At the lower right hand corner of program steps 5, 10, 11 and 14, a note is made indicating that the buffer access gating circuit 69 develops a high potential signal during those program steps. Therefore, if the reader access flip-flop R1, in the source of data signals 34, represents a digit 0 the timing flip-flops F1 and F2 will both be reset during program steps 5, 10, 11, and 14. During program step 7, the command character register 14 is in state 3 and the timing flip-flops F1 and F2 represent digits 1, 0. Therefore, the following clock pulse resets both the timing flip-flops F1 and F2 to represent a digit 0. During program steps 4 and 6, the command character register 14 is in states 6 and 3, respectively. Therefore, the timing flip-flops F1 and F2 will be set to represent digits 1, 0, during program step 4 and during program step 6 if both the flip-flops F1 and F2 represent a digit 0. Also, the flip-flop circuits F1 and F2 will be set to represent digits 1, 0 when the buffer access permitted signals are developed during program steps 5, 10 and 11, if the reader access flip-flop R1, in the source of data signals 34, represents a digit 1. Referring to FIG. 2, a buffer unit 96 is provided. Whenever signals are to be written into either the buffer unit 96 or the memory unit 42, the timing flip-flops F1 and F2 are triggered to represent digits 0, 1. Whenever signals are to be written into the buffer unit 96, the flip-flop circuits R2, M8 and F1 all represent a digit 1. This occurs during program step 12 and the following clock pulse triggers the timing flip-flops F1 and F2 to represent the digits 0, 1. During the program step 10, signals are written into the memory unit 42. At this time, the command character register 14 is in state 9 and the timing flip-flops F1 and F2 both represent a digit 1, causing the following clock pulse to trigger the timing flip-flops F1 and F2 to represent digits 0, 1. During the program step 9 signals stored in the A and B operand registers 30 and 32 are added. It is only during program step 9 that the timing flip-flops F1 and F2 both represent a digit 1. Therefore, during program step 8 the command character register 14 is in state 9 and the timing flip-flops F1 and F2 both represent a digit 0 and the following clock pulse triggers both the flip-flop circuits F1 and F2 to represent a digit 1.

With the command character gating circuits 45 and the F1 and F2 flip-flop gating circuit 62 in mind, the gating circuits 79 and 81 for the timing flip-flops T1 and T2, respectively, will now be explained with reference to FIG. 3C. To be explained, the timing flip-flop T1, is used for controlling the set of the timing flip-flop T2, and the flip-flop circuit T2 indicates the larger of the two field length characters. The T1 flip-flop gating circuit 81 is connected to the T2 flip-flop circuit indicated by dashed lines). The set input circuit or the input which controls the setting of flip-flop T1 to represent a digit 1 is connected to the $r2$ output circuit of the command character register 14. The input circuit for resetting the timing flip-flop T1, or resetting it to represent a digit 0, is connected to an output circuit of an "and" gating circuit 84. The "and" gating circuit 84 has three input circuits which are connected to the output circuit $r9$ of the command character register 14 and the $F_2$ and $F_1$ output circuits of the flip-flop circuits F1 and F2. Thus, referring to FIGS. 8A and 8B, the timing flip-flop T1 will be set during program step 2 after a new order is shifted out of the storage means 10 and will be reset during program step 9 when the command character register is in state 9 and both the flip-flop circuits F1 and F2 represent a digit 1.

The timing flip-flop T2 has its set circuit connected to an output circuit of an "and" gating circuit 86 of the T2 gating circuit 79. Before explaining the input circuits of the "and" gating circuit 86, a brief explanation of output circuits from the processing unit 22 will be given. Referring to FIG. 2, the processing unit 22 has an adder circuit 88. The output circuit of the adder circuit 88 has a group of sum lines 93 for developing signals which represent the result of its operation. Two output lines CL and CL′ are provided for indicating any carry-out for the next character to be operated on. Whenever a high potential output signal is developed at the output circuit CL, there is a carry-out to the next character to be processed. Whenever the output circuit CL′ is at a high potential, it indicates that there is no carry-out. Referring again to FIG. 3C, the "and" gating circuit 86 has its four input circuits connected to the output circuit CL of the adder circuit 88, the output circuit $r6$ of the command character register 14 and the $F_1$ and $T_1$ output circuits of the flip-flop circuits F1 and T1. The input circuit of the timing flip-flop T2, for resetting it, is connected to the $r15$ output circuit of the command character register. Thus, whenever a new order has been shifted out of the storage means 10 and the first characters of two operands are being processed, the timing flip-flop T1 is true, the flip-flop circuit F1 is true and the command character register 14 is in state 6, the timing flip-flop T2 will be set if there is a carry-out signal from the adder circuit 88. The timing flip-flop T2 will then be reset during state 15 of the command character register 14. Both the flip-flops T1 and T2 are connected to the start switch Sw1, and are reset whenever it is actuated.

Referring again to FIG. 2, the memory unit 42 of the storage means 10 has its input circuits, for receiving address signals, coupled to the output circuits of the memory address register 16, the command address register 12 and the command character register 14. As mentioned, the memory unit 42 is a coincident current core unit and has gating circuits (not shown) for decoding the outputs of the registers 12, 14 and 16 for energizing current driving circuitry (not shown) for reading and writing into the cores (not shown). All reading and writing is done a character at a time. It should be noted also that whenever a character is read out of the memory unit 42 (or the buffer unit 96), gating and register circuits (not shown) restore that character into the same storage location to thereby provide a non-destructive type read-out storage unit. The memory unit 42 also has three read and write control circuits connected to the output circuit of the gating circuits 40 of the signal generator 36. These three lines will be referred to as the read command register line 90, the read memory address register line 91 and the write memory address register line 92. Whenever a high potential signal is developed on the read command register line 90, the character stored in the memory location specified by the states of the command address register 12 and the command character register 14 is read out. Similarly, whenever a high potential signal is developed on the read memory address register line 91, the character stored in the memory location specified by the memory address register 16 is read out.

A C register 94 is connected to the output circuit of the memory unit 42. The C register circuit 94 has flip-flop circuits designated C1 through C4 which have double ended input circuits connected to the memory unit 42. The output signals of the memory unit 42 are always automatically stored into the C register 94 flip-flops independent of clock pulses. Thus, whenever a read signal is developed on either of the read lines 90 or 91 the resultant output signals from the addressed memory location of the memory unit 42 are automatically read and stored by the C register 94. Outputs of the C register 94 flip-flops are also connected to the memory unit 42 so that whenever a high potential signal is developed on the write memory address register line 92, the memory unit 42 automatically writes the character stored in the C register 94 into the memory location addressed by the memory address register 16.

The storage means 10 also has a buffer unit 96 which is a coincident current core unit similar to the memory unit 42, but smaller. The buffer unit 96 has individually addressable storage locations for storing characters of information. Connections are provided between the memory unit 42 and the buffer unit 96 for transferring characters of information from the buffer unit 96 to the memory unit 42 (by control circuitry not shown).

The buffer unit 96 has a storage location 97 for storing the address of the next storage location in the buffer unit 96 into which information is to be stored. The buffer unit 96 also has gating and current driving circuits (not shown) its core units (not shown), which are connected to the output circuit of the memory address register 16, for receiving address signals. The gating and driving circuits of the buffer unit 96 are connected to a write control line 98 and a read buffer address line 100. The lines 98 and 100 receive their control signals from the gating circuits 40 of the signal generator 36. Other input and output circuits of the buffer unit 96 are connected to the C register 94. Whenever a high potential signal is developed on the read buffer address line 100, the next buffer address stored in the buffer storage location 97 in the buffer unit 96 is shifted out and stored in the C register 94. If the M8 flip-flop in the memory address register 16 represents a digit 1 and a high potential signal is developed on the write line 98, the contents of the C register 94 will be written into the storage location 97 of the buffer unit 96. If the flip-flop circuit M8 represents a digit 0 and a high potential signal is developed on the write line 98, the contents of the C register 94 is written into the storage location of the buffer unit 96 specified by the contents of the memory address register 16. By way of example, it is assumed that the buffer unit 96 only receives address signals for writing from the units section of the memory address register 16, in contrast to the memory unit 42 which receives address signals from the entire memory address register 16.

The clock pulse generator 38 is connected to the memory unit 42 and the buffer unit 96 for applying clock pulses thereto. Referring to FIG. 10, timing generators (not shown) are provided in the memory unit 42 and the buffer unit 96 for causing a read and write cycle to take place under the control of signals on the above mentioned control lines in between the occurrence of clock pulses. It should be noted that when a character is to be read out of the buffer unit 96 or the memory unit 42, it is done so, and stored in the C register 94, in advance of the write of a character of information, both of which occur well in advance of the succeeding clock pulse.

The gating circuits for developing the read and write signals on the control lines for the memory unit 96 and the buffer unit 97 are shown in FIG. 3E and FIG. 3F. Referring now to FIG. 3E, a memory unit gating circuit 104 is shown having "and" gating circuits 101, 102 and 103 which are connected to the read command register line 90, the read memory address register line 91, and the write memory address register line 92. The "and" gating circuit 101 has three input circuits which are connected to the $R_2'$, the $F_2'$ and the $F_1'$ output circuits of the flip-flop circuits R2, F2 and F1. The "and" gating circuit 102 has its input circuits connected to the $R_2'$, the $F_2'$ and the $F_1$ output circuits of the flip-flop circuits R2, F2 and F1. The "and" gating circuit 103 has three input circuits which are connected to the $R_2'$, the $F_2$ and the $F_1'$ output circuits of the flip-flop circuits R2, F2 and F1. Thus, whenever the timing flip-flop R2 represents a digit 0, which indicates that signals are not to be stored in the buffer unit 96, and the flip-flop circuits F1 and F2 represent the digits 00, 10, and 01, high potential signals will be developed on the read command register line 90, the read memory address register line 91 and the write memory address register line 92, respectively.

Referring now to FIG. 3F, a buffer unit gating circuit 105 is shown which has two "and" gating circuits 106 and 107. The "and" gating circuits 106 and 107 are connected to the write line 98 and the read buffer address line 100. One input circuit of both the "and" gating circuits 106 and 107 are connected to the $R_2$ output circuit of the flip-flop circuit R2. The other input circuits of the "and" gating circuits 106 and 107 are connected to the output circuits $F_2$ and $F_2'$ of the flip-flop circuit F2. Write and read signals will be developed on the write line 98 and the read buffer address line 100 whenever the timing flip-flop R2 represents a digit 1, indicating a buffer unit 96 access is to take place and the flip-flop circuit F2 represents a digit 1.

Referring again to FIG. 2, the memory address register 16 has three sections of flip-flop circuits and gating circuits for storing the three characters of each operand address. The three sections are called the units, tens and hundreds sections for storing the units, tens and hundreds characters of the operand addresses. The memory address register 16 has its input circuit connected to the sum lines 93 out of the adder circuit 88. The units section of the memory address register 16 is also connected to the output circuit of the C register 94.

The memory address register 16 has seven control circuits for storing information and for clearing or resetting the flip-flop circuits therein to represent a digit 0. A reset line 110 is for clearing the memory address register 16 or resetting all flip-flops. A reset M8 line 111 is provided for resetting only the M8 flip-flop. A set M8 line 112 is for setting only the M8 flip-flop to represent a digit 1. Store lines 113, 114, and 115 are for causing the memory address register 16 to store the output signals of the adder circuit 88 into the units, tens and hundreds sections, respectively, of the memory address register 16. A store units line 116 is also provided for causing the output signals of the C register 94, rather than the adder circuit 88, to be stored in the units section of the memory address register 16.

A memory address register gating circuit 119 for providing the control signals to the lines 110 through 116 are shown in FIG. 3G. Referring to FIG. 3G, the lines 110 through 116 are connected to the output circuits of gating circuits 120 through 126, respectively. The gating circuit 120 is an "or" gating circuit and has two input circuits. One input circuit of the "or" gating circuit 120 is connected to the BAP output circuit of the buffer access gating circuit 69 (see FIG. 3D). The other input circuit of the "or" gating circuit 120 is connected to an output circuit of an "and" gating circuit 130. The "and" gating circuit 130 has three input circuits. The three input circuits are connected to the *r*3 output circuit of the command character register 14 and the F1 and $F_2'$ output circuits of the flip-flop circuits F1 and F2. Thus, a reset signal will be provided on the reset line 110 whenever a buffer access signal is developed or the command character register 14 is in state 3 and the flip-flop circuits F1 and F2 represent digits 1, 0.

The gating circuit 121 is an "and" type gating circuit and has two input circuits, which are connected to the BAP output circuit of the buffer access gating circuit 69 and the output circuit $R_2$ of the flip-flop circuit R2. Thus, the flip-flop circuit M8 will be reset to represent a digit 0 whenever a buffer access signal is developed and the reader access flip-flop R2 represents a digit 1.

The gating circuit 122 is an "and" type gating circuit which has two input circuits. The two input circuits of the "and" gating circuit 122 are connected to the output circuits BAP of the buffer access gating circuit 69 and the $R_1$ output circuit of the reader access flip-flop R1. Thus, a set signal will be developed on the set M8 line 112 whenever a character of data is to be read as indicated by the true state of the R1 flip-flop and there is a buffer access permitted signal.

The gating circuit 123 is an "or" gating circuit which has three input circuits. The three input circuits of the "or" gating circuit 123 are connected to the output circuits *r*5, *r*8, and *r*11 of the command character register 14. Thus, store signals will be developed on store units line 113 during states 5, 8, and 11 of the command character register 14.

The gating circuit 124 is also an "or" type gating circuit which has three input circuits. The three input circuits of the "or" gating circuit 124 are connected to the *r*4, *r*7 and *r*10 output circuits of the command character register 14. Whenever the command character register 14 steps into states 4, 7 or 10, a store signal is developed on the store tens line 114.

The gating circuit 125 is an "and" gating circuit which has two input circuits. The two input circuits of the "and" gating circuit 125 are connected to output circuits of an "and" type gating circuit 132, and an "or" type gating circuit 133. The "and" gating circuit 132 has two input circuits which are connected to the output circuits $F_2'$ and $F_1'$ of the flip-flop circuits F2 and F1. The "or" gating circuit 133 has three input circuits which are connected to the output circuits *r*3, *r*6 and *r*9 of the command character register 14. Store signals will be developed on the store hundreds line 115 whenever the command character register 14 is in any of the states 3, 6 and 9 and whenever the flip-flop circuits F1 and F2 are both false.

The gating circuit 126 is an "and" type gating circuit and has two input circuits. The two input circuits of the "and" gating circuit 126 are connected to the $R_2$ and $F_1$ output circuits of the flip-flop circuits R2 and F1. A store signal will be developed on the store units line 116 whenever both flip-flop circuits R2 and F1 represent a digit 1.

Referring again to FIG. 2, the C register 94 has its input connected to the output circuit of the memory unit 42, the buffer unit 96, the source of data signals 34, and the sum lines 93 out of the adder circuit 88. Gating circuits (not shown) are provided in the C register 94 for automatically reading and storing output signals developed by the memory unit 42 and the buffer unit 96. This is done independently of clock pulse signals. The C register 94 is also connected to the output circuit of the gating circuits 40 of the signal generator 36 by a store line 140 and a store data line 141. Whenever a high potential signal is developed on the store line 140, the following clock pulse signal causes the C register 94 to read and store the output signals of the source of data signals 34.

Refer now to FIG. 3H A C register gating circuit 143 is shown which has an "and" type gating circuit 144 and an "or" type gating circuit 146 which are connected to the store data line 141 and the store line 140, respectively. The "and" gating circuit 144 has three input circuits which are connected to the $R_2$, $M_8$ and $F_2$ output circuits of the flip-flop circuits R2, M8 and F2. The "or" gating circuit 146 has two input circuits which are connected to output circuits of "and" gating circuits 148 and 150. The "and" gating circuit 148 has three input circuits, which are connected to the output circuits $R_2$, $M_8$ and $F_1$ of the flip-flop circuits R2, M8 and F1. The "and" gating circuit 150 has two input circuits, which are connected to the output circuit *r9* of the command character register 14 and the $F_1$ output circuit of the flip-flop circuit F1. Therefore, whenever the flip-flop circuit R2 is true, indicating a character of data from the source of data signals 34 is to be stored in the buffer unit 96, and the flip-flop circuits M8 and F2 both represent a digit 1, a store signal will be developed on the store data line 141. When the flip-flop circuit R2 is true, and the flip-flop circuits M8 and F1 both represent a digit 1, or the flip-flop circuit F1 is true and the command character register 14 is in state 9, a store signal is developed on the store data line 140.

With the description of the storage means 10 and the associated gating circuits in mind, a detailed description will now be given of the B and A field length registers 26 and 28 and their associated gating circuits. Referring to FIG. 2, the B and A field length registers 26 and 28 have their input circuits connected to the sum lines 93 out of the adder circuit 88. The field length registers 26 and 28 also have gating circuits and flip-flop circuits (not shown) connected to the output circuit of the gating circuits 140 of the signal generator 36. The B field length register 26 is connected to a store line 154, a count down line 155, and a reset line 156. Similarly, the A field length register 28 is connected to a store line 158, a count down line 159, and the reset line 156. Whenever a high potential signal is developed on the store line 158 and the store line 154, the following clock pulse causes the A and B field length registers 28 and 26, respectively, to read and store signals corresponding to the signals on the sum line 93. Also, when a high potential signal is developed on the count down line 159 and the count down line 155, the following clock pulse causes the A and B field length registers 28 and 26, respectively, to operate as a counting circuit and count down the magnitude of the character stored in the respective registers by one. The A and B field length registers 28 and 26 each continue decreasing the magnitude of the character stored in the respective registers by one until their contents are equal to 0. The next count down signal and clock pulse causes the register in state 0 to count from state 10 to state 15. With a field length register storing the number 15, the following count down pulses are ineffective in causing any further count down of that register and the register remains in state 15 until a reset signal is developed on the reset line 156, and a new character stored therein. Whenever a high potential signal is developed on the reset line 156, the following clock pulse causes both the A and B field length registers 28 and 26 to be reset to 0.

Referring now to FIG. 3I, a detailed description will now be given of the gating circuits for the A and B field length registers 28 and 26. FIG. 3I shows an A and B field length gating circuit 160, with the A and B field length registers 28 and 26 shown in dashed lines. The store lines 158 and 154 are connected to the *r1* and *r2* output circuits of the command character register 14. The count down lines 159 and 155 are connected to output circuits of "and" gating circuits 162 and 163. The "and" gating circuits 162 and 163 both have four input circuits. The four input circuits of the "and" gating circuit 162 are connected to the F1 and F2 output circuits of the flip-flop circuits F1 and F2, the *r9* output circuit of the command character register 14, and the $A_f+15$ output circuit of the A field length register 28. The four inputs of the "and" gating circuit 163 are the same as the "and" gating circuit 162, except one input circuit is connected to the $B_f+15$ output circuit of the B field length register 26, rather than the $A_f+15$ output circuit of the A field length register 28. The reset line 156 is connected to the output circuit of an "and" gating circuit 164. The "and" gating circuit 164 has five input circuits. Two of the input circuits of the "and" gating circuit 164 are connected to the $F_1'$ and $F_2$ output circuits of the flip-flop circuits F1 and F2, and the other three input circuits are connected to the *r9*, $A_f=15$ and $B_f=15$ output circuits of the command character register 14, and the A field length register 28 and the B field length register 26. Thus, whenever the command character register 14 steps into states 1 and 2, store signals will be developed on the store line 158 and 154, respectively. Also, whenever the characters in the A and B field length registers 28 and 26 do not equal 15, both flip-flop circuits F1 and F2 represent a digit 1 and the command character register 14 is in state 9, count down signals will be developed on the count down lines 159 and 155, respectively. A reset signal will be developed on the reset line 156 during state 9 whenever a character 15 is stored in both the A and B field length registers 28 and 26, and the flip-flop circuits F1 and F2 represent digits 0, 1.

Referring again to FIG. 2, a detailed description will now be given of the A and B operand registers 30 and 32. The A and B operand registers 30 and 32 each have four flip-flop circuits, designated A1 through A4 and B1 through B4, respectively. Each of the operand registers 30 and 32 have gating circuits (not shown) connected to the flip-flop circuits for reading and storing a character of digital information therein. Input circuits of each of the operand registers 30 and 32 are connected to the output circuit of the C register 94. The B operand register 32 has another input circuit connected to the sum lines 93 out of the adder circuit 88. The A operand register 30 has two control circuits which are connected to the gating circuits 40 of the signal generator 36 by a reset line 168 and a store line 169. The B operand register 32 is also connected to a store line 170 and the reset line 168 and, in addition, is connected to a store adder line 171. Whenever a high potential store signal is developed on the store lines 169 and 170, the output signals of the C register 94 are read and stored by the A and B operand registers 30 and 32, respectively, at the following clock pulse. Whenever a high potential reset signal is developed on the reset line 168, the contents of both the A and B operand registers 30 and 32 are cleared or reset. Whenever a high potential store signal is developed on the store adder line 171, the B operand register 32 reads and stores the signals on the sum lines out of the adder circuit 88.

Figure 3K:
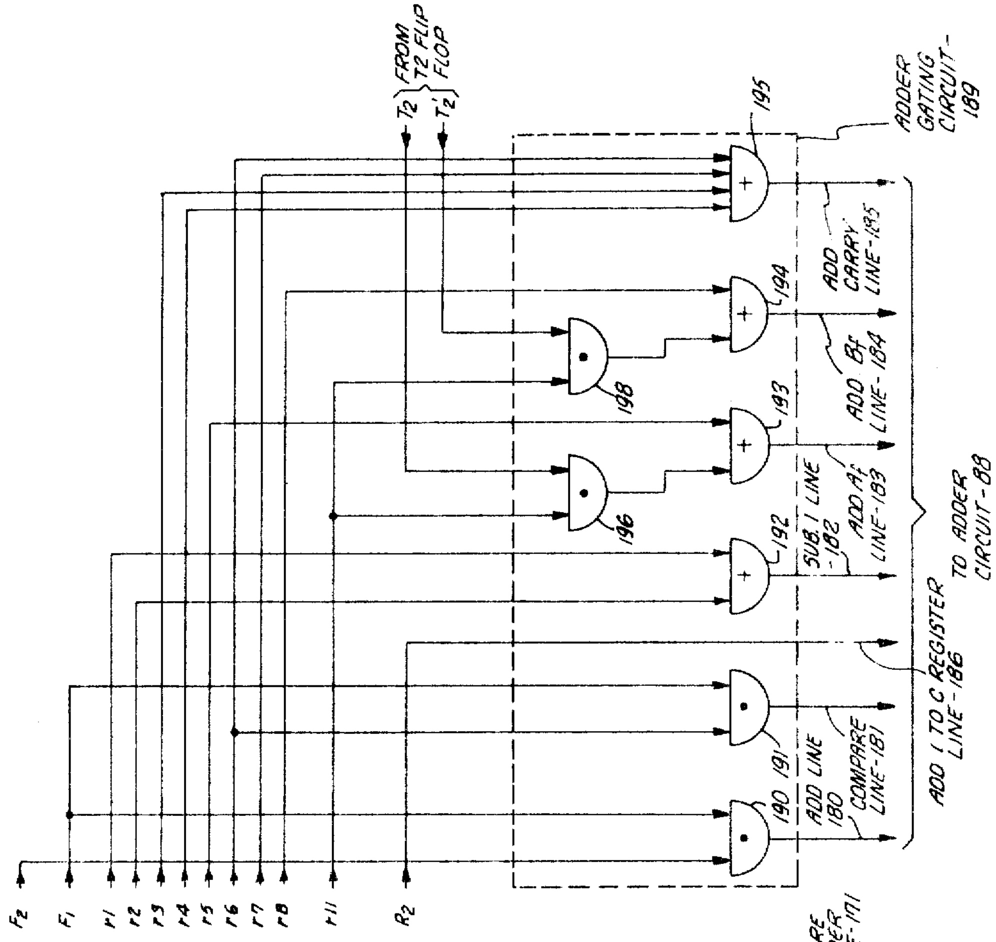
Figure 3J:
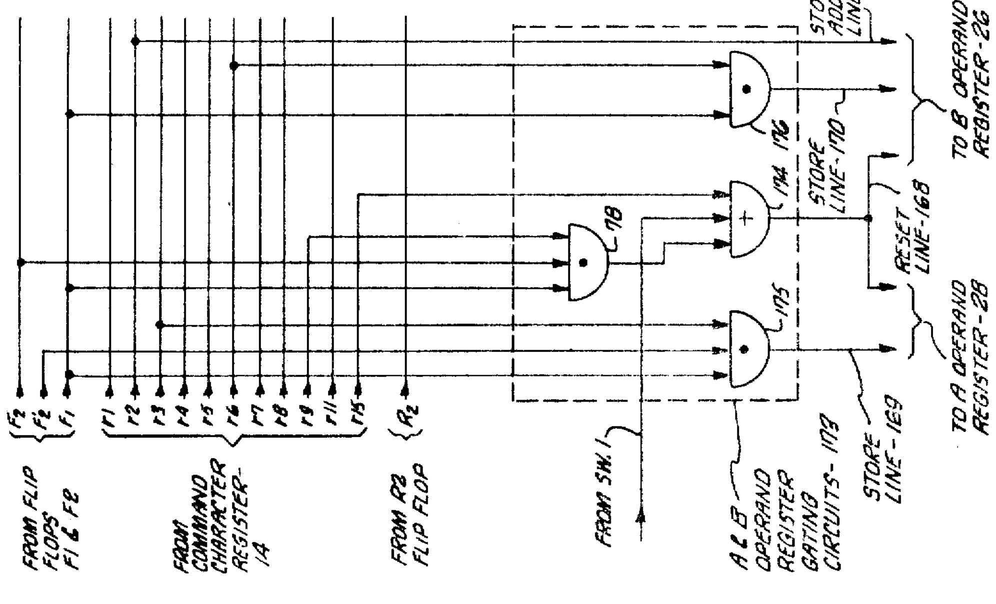

FIG. 3J is a detailed schematic diagram of an A and B operand gating circuit 173 for the A and B operand registers 30 and 32. Referring now to FIG. 3J, the reset line 168, the store line 169 and the store line 170 are connected to the output circuits of gating circuits 174, 175 and 176. The store adder line 171 is connected to the output circuit *r2* of the command character register 14. The gating circuit 174 is an "or" type gating circuit which has two input circuits. The two input circuits of the "or" gating circuit 174 are connected to the output circuit *r15* of the command character register 14 and an "and" gating circuit 178. The "and" gating circuit 178 has three input circuits which are connected to the output circuits $F_1$ and $F_2$ of the flip-flop circuits F1 and F2, and the *r9* output circuit of the command character register 14. The gating circuit 175 is an "and"

type gating circuit and has three input circuits. The three input circuits of the "and" gating circuit 175 are connected to the output circuits $F_1$ and $F_2'$ of the flip-flop circuits F1 and F2, and the $r3$ output circuit of the command character register 14. The gating circuit 176 is an "and" type gating circuit having two input circuits which are connected to the $F_1$ output circuit of the flip-flop circuit F1 and the $r6$ output circuit of the command character register 14.

The A and B operand gating circuit 173 operates as follows. A resest signal is developed on the reset line 168 whenever the command character register 14 steps into state 15, or when it is in state 9 and both the flip-flop circuits F1 and F2 represent a digit 1. A store signal is developed on the store line 169 whenever the command character register 14 is in state 3 and the flip-flop circuits F1 and F2 represent digits 1 and 0, respectively. A store signal is developed on the store line 170 whenever the command character register 14 is in state 6 and the flip-flop circuit F1 represents a digit 1. A store signal is developed on the store adder line 171 whenever the command character register 14 steps into state 2.

Referring again to the processing unit 22 shown in FIG. 2, the adder circuit 88 has two input circuits for receiving signals which are to be processed. The two input circuits are referred to as the $x$ input and the $y$ input. The output circuit of the C register 94 and the B operand register 32 are connected to the $x$ inputs of the adder circuit 88. The output circuits of the A and B field length registers 28 and 26, and the A operand register 30 are connected to the $y$ input circuits of the adder circuit 88. The adder circuit 88 also has seven control circuits which receive control signals from the gating circuits 40 of the signal generator 36. These control circuits are connected to the gating circuits 40 by means of an add line 180, the compare line 181, a subtract one line 182, an add A field length line 183, an add B field length line 184, an add carry line 185 and an add one to C register line 126. The adder circuit 88 is responsive to a high potential signal on the add line 180 to add the operand characters in the A operand register 30 and the B operand register 32 together in parallel in the decimal number system and provide an output signal on the sum lines 93 corresponding thereto. If there is a carry, this is indicated by a high potential signal on the carry level line CL. Such an adder circuit may be made of four conventional field adder circuits for adding all bits of the operand characters at once with a carry-out circuit for developing the CL and CL' signals. It should also be noted at this point that whenever the A and B operands are added, any carry-out is stored in the carry flip-flop *Cal* in the adder circuit 88.

Whenever a high potential signal is developed on the compare line 181, the adder circuit 88 compares the character stored in the B operand register 32 with the character stored in the A field length register 28 and provides a high potential carry level signal at the output circuit CL whenever the character in the A field length register 28 is larger than the character in the B operand register 32. It should be noted that the adder circuit 88 may be arranged for comparing by providing the carry signal by connecting a 9's complementing circuit between the output of the B operand register 32 and the $x$ input of the four adder circuits of the adder circuit 88. With this arrangement the 9's complement of the character in the B operand register 32 added to the contents of the A field length register 28 will only cause a carry if the number in the A field length register 28 is larger than the number in the B operand register 32.

Whenever a high potential signal is developed on the subtract 1 line 182, the adder circuit 88 subtracts a binary 1 from the magnitude of the character in the C register circuit 94 and develops an output signal on the sum lines 93 corresponding thereto. It should be understood that the adder circuit 88 may be arranged for performing this function in a conventional manner known in the art by the use of gating circuits connected to the subtract line 182 and the $y$ input of the adder circuit 88.

Whenever an add signal is developed on the add A field length line 183, the least significant character of the beginning address of an operand has already been stored in the C register 94. Whenever the high potential add signal is applied on the add A field length line 183, the adder circuit 88 adds the character (least significant address character) stored in the C register 28 in the decimal number system and provides an output signal corresponding to the sum of the two numbers at the sum lines 93. Another carry flip-flop (not shown) stores any carry-out of this operation internally. Whenever a high potential add signal is developed on the add carry line 185, the second or third character of the beginning address has previously been stored in the C register 94. The add carry signal on the add carry line 185 then causes any carry from the addition of the previous character, as indicated by the carry flip-flop (not shown), to be added to the address characters, and the result signal developed on the sum lines 93. When a high potential signal is developed on the add B field length line 184, the operation of the adder circuit 88 is similar to that when a high potential signal is developed on the add line 183, except that the character in the B field length register 26 is added to the address character in the C register 94, rather than the number in the A field length register 28.

A high potential add signal on the add 1 line 186, causes a digit 1 to be added to the character stored in the C register 94. This addition is made in the number base 2 and signals corresponding to this sum are developed on the sum lines 93.

With the general operation of the adder circuit 88 in mind, a detailed description will now be given of the gating circuits for providing the control signals of the adder circuit 88. Referring now to FIG. 3K, an adder gating circuit 189 is shown. The add line 180, the compare line 181, the subtract 1 line 182, the add A field length line 183, the add B field length line 184 and the add carry line 185 are connected to output circuits of gating circuits 190 through 195 respectively. The gating circuit 190 is an "and" type gating circuit, which has two input circuits. The two input circuits of the AND gating circuit 190 are connected to the $F_2$ and $F_1$ output circuits of the flip-flop circuits F2 and F1. The gating circuit 191 is also an AND type gating circuit and has two input circuits which are connected to the $r6$ and the $F_1$ output circuits of the command character register 14 and the flip-flop circuit F1. The gating circuit 192 is an OR type gating circuit and has two input circuits which are connected to the $r_1$ and $r_2$ output circuits of the command character register 14. The gating circuit 193 is an OR gating circuit which has two input circuits. The two input circuits of the OR gating circuit 193 are connected to the $r5$ output circuit of the command character register 14 and an AND gating circuit 196. The AND gating circuit 196 has two input circuits, which are connected to the output circuit $r11$ of the command character register 14 and the $T_2$ output circuit of the timing flip flop T2. The gating circuit 194 is an OR type gating circuit which has two input circuits. The two input circuits of the OR gating circuit 194 are connected to the $r8$ output circuit of the command character register 14 and an AND gating circuit 198. The AND gating circuit 198 has two input circuits which are conneted to the $r11$ and the $T_2'$ output circuits of the command character register 14 and the timing flip-flop T2. The gating circuit 195 is an OR gating circuit and has four input circuits which are connected to the $r3$, $r4$, $r6$ and $r7$ output circuits of the command character register 14. The add 1 line 186 is connected to the $R_2$ output circuit of the reader access timing flip-flop R2.

The operation of the adder gating circuit 189 is as follows. An add signal is developed on the add line 180 whenever both the timing flip-flops F1 and F2 represent a digit 1. A compare signal is developed on the compare line 181 during state 6 of the command character register 14 if the F1 flip-flop represents a digit 1. A subtract signal is developed on the subtract 1 line 182 during states 1 and 2 of the command character register 14. An add signal is developed on the add A and B field length lines 183 and 184 during state 11 when the A field length character is larger and smaller than the B field length character, represented by the true and false states, respectively, of the timing flip-flop T2. Add signals are also developed on the add A and B field length lines 183 and 184 during states 5 and 8, respectively, of the command character register 14. An add signal is developed on the add carry line 185 during states 3, 4, 6 and 7 of the command character register 14. An add signal is developed on the add 1 line 186 whenever the reader access flip-flop R2 represents a digit 1.

Referring again to the adder circuit 88 of FIG. 2, the carry flip-flop *Cal*, indicated by dashed lines, is used in place of the above-mentioned carry flip-flop (not shown) in the adder circuit 88 only for storing carry signals when operand characters stored in the A and B operand registers 30 and 32 are to be added. The *Cal* gating circuit 200 is shown in FIG. 3L. With reference to FIG. 3L, the set input circuit of the carry flip-flop *Cal* is connected to an input circuit of an AND gating circuit 202 which has four input circuits. The four input circuits of the AND gating circuit 202 are connected to the *r9* output circuit of the command character register 14, the F1 and F2 output circuits of the flip-flop circuits F1 and F2, and the CL output circuit of the adder circuit 88. The reset input circuit of the carry flip-flop *Cal* is connected to the output circuit of an OR type gating circuit 203 which has two input circuits. The two input circuits of the OR gating circuit 203 are connected to the *r15* output circuit of the command character register 14, and an output circuit of an AND gating circuit 204. The AND gating circuit 204 has four input circuits which are identical to the input circuits for the AND gating circuit 202, except one input circuit is connected to the CL' output circuit of the adder circuit 88, instead of the CL output circuit thereof.

The start switch *Sw1* is connected to the carry flip-flop *Cal*. The start switch *Sw1* causes the carry flip-flop *Cal* to be reset when actuated.

The carry flip-flop *Cal* will receive a set signal if there is a carry signal out of the adder circuit 88 and will receive a reset signal if there is no carry signal out of the adder circuit 88 during state 9 of the command character register 14 if both the flip-flop circuits F1 and F2 represent a digit 1. Also a reset signal will be provided to the carry flip-flop *Cal* during state 15 of the command character register 14.

Referring now to FIG. 3M, a detailed schematic diagram is shown of the gating circuit 210 for the reader access flip-flop R2. The set input circuit of the reader access flip-flop R2 is connected to the output circuit of an AND gating circuit 211 which has two input circuits. The reset input circuit of the flip-flop circuit R2 is also connected to an AND gating circuit 212 which has two input circuits. One of the input circuits of each of the AND gating circuits 208 and 209 are connected to the output circuit BAP of the buffer access gating circuit 69 (see FIG. 3D). The other input circuits of the AND gating circuits 211 and 212 are connected to the $R_1$ and $R_1'$ output circuits of the reader access flip-flop R1, located in the source of data signals 34. Therefore, the reader access flip-flop R2 will receive set and reset signals whenever a buffer access signal is developed and the reader access flip-flop R1 is true and false, respectively.

With reference to FIG. 3D, a description will now be given of the buffer access gating circuit 69. An OR gating circuit 83 is provided which has four input circuits. The four input circuits of the OR gating circuit 83 are connected to the R15 output circuit of the command character registser 14, and the output circuits of AND gating circuits 85, 87 and 89. The AND gating circuit 85 has three input circuits which are connected to the R2, $M_8'$ and $F_1'$ output circuits of the flip-flop circuits R2, M8 and F1. The three input circuits of the AND gating circuit 87 are connected to the output circuits R9, $F_1'$ and $F_2$ of the command character register 14 and the flip-flop circuits F1 and F2. The AND gating circuit 89 has two input circuits which are connected to the output circuits R6 and $F_1$ of the command character register 14 and the flip-flop circuit F1.

Thus, referring to FIG. 3D and the flow chart of FIGS. 8A and 8B, a buffer access signal is developed at the BAP output circuit of the buffer access gating circuit 69 during state 6 of the command character register 14 if the F1 represents a digit 1, during state 9 of the command character register 14 if the flip-flops F1 and F2 represents digits 0, 1, during state 15 of the command character register 14 and whenever the flip-flop circuits M8, R2 and F1 represent digits 0, 1, 0.

The reset line 95 for resetting the flip-flop R1 is connected to an R1 gating circuit 93 shown in FIG. 3D. The gating circuit 93 is an AND type gating circuit having two input cricuits which are connected to the $R_2$ and the $F_2'$ output circuits of the flip-flop circuits R2 and F2. Therefore, a reset signal is developed on the reset line 95 during the time a buffer access is taking place and the flip-flop circuits R2 and F2 represents digits 1, 0.

Referring again to FIG. 2, the order register 18 is connected to the R0 output circuit of the command character register 14. A store signal is developed on the R0 output circuit of the command character register 14 during state 0 and the following clock pulse causes the order register 18 to store the order of a command which was shifted out of the memory unit 42 and stored in the C register 94 in between clock pulses. The output circuits of the order register 18 were not shown connected to any of the gating circuits 40 of FIGS. 3A through 3M in order to simplify the drawings.

However, if other commands are to be carried out such as add, subtract, multiply, et cetera, the appropriate output circuits of the C register 94 must be connected to each of the gating circuits 40 to allow these gating circuits to properly sequence the operation of the data processor to define the various commands.

With the detailed description of the processor of FIG. 2 in mind, a few general observations will be noted first before describing its operation in detail. Referring to FIGS. 8A and 8B, it should be noted that each of the program steps 1 through 14 are entered at a clock pulse time and the following clock pulse causes the processor to enter the following program step as indicated. The only exceptions to this rule are program steps 4, 6 and 8, which are three clock pulses long.

Assuming that there is not to be a reader access, the reader access flip-flops R1 and R2 represent a digit 0, it should generally be noted that whenever the flip-flops F1 and F2 both represent a digit 0, information is to be read from the memory unit 42 using the address signals stored in the command registers 12 and 14, rather than the memory address register 16. Whenever the flip-flop circuits F1 and F2 represent digits 0, 1, respectively, a character of information is to be written into the memory unit 42 using the address signals stored in the memory addresss register 16. Whenever both the flip-flop circuits F1 and F2 represent a digit 1, the operand characters stored in the A and B operand registers 30 and 32 are added together by the adder circuit 88.

To illustrate the operation of the processor of FIG. 2, it is assumed that the first command is that shown in FIG. 4. As already noted, the A and B operands are the decimal numbers 178 and 65. The sum of the two numbers is equal to 178+65=243. To be explained, the result characters 243 will be stored in the memory locations 205, 206 and 207, as indicated in dashed lines in FIG. 5, after the command indicated in FIG. 4 is fully executed.

FIG. 6 is a timing diagram which illustrates the binary digit representation of the timing flip-flops T1, T2, F1 and F2, and the carry flip-flop *Cal*, as well as the characters being stored in the command character register 14, the C register 94, the A and B field length registers 28 and 26, the memory address register 16, the A and B operand registers 30 and 32, and the order register 18 while executing the command shown in FIG. 4 on the operands shown in FIG. 5. To simplify the explanation, the operation indicated in FIG. 6 assumes that there will not be any buffer access, and the reader accesss flip-flop R1 and F2 always represent a digit 0.

Referring now to FIGS. 2 and 6, assume that initially the start Sw1 is actuated. This resets the timing flip-flops T1, T2, F1, F2 and the carry flip-flop *Cal*. The actuated start Sw1 also causes the command character register 14, the A and B field length registers 28 and 26, the memory address register 16 and the A and B operand registers 30 and 32 to be cleared or reset to 0. It should be noted that the C register 94 was not reset but contains information used during a previous command which does not affect the present command. With the command character register 14 in state 0, the program step 1 is entered. Since the timing flip-flops F1 and F2 both represent a digit 0, a read signal is developed on the read command register line 90 causing the memory unit 42 to be addressed signals stored in the command registers 12 and 14. It is assumed that in its reset or initial state of operation the command address register 12 addresses the storage location containing the command of FIG. 4. Since the command character register 14 is in state 0, the order character 1 of the command is shifted out of the memory unit 42 and stored in the C register 94. A store signal is now developed at the input of the order register 18, and a set of state 2 signal to the command character register 14. The following clock pulse causes the character 1 in the C register 94 to be stored in the order register 18, and the command character register 14 is set to state 2. The processor is now at the beginning of program step 2, the timing flip-flop circuits T1, T2, F1 and F2 all represent a digit 0 and the A and B field length register 28 and 26, the A and B operand registers 30 and 32 and the memory address register 16 are now storing 0 characters.

Another read signal is now developed on the read command register line 90 which causes the memory unit 42 to be addressed using the address signals in the command registers 12 and 14. Since the command character register 14 is in state 2, the B field length character 2 is now shifted out and stored in the C register 94. A subtract signal is now developed on the subtract 1 line 182, causing the adder circuit 88 to subtract 1 from the character 2 stored in the C register 94. Also, a store signal is developed on the store line 154 to the B field length register 26, a set to state 1 signal is developed at the input circuit of the command character register 14 and a set signal is developed at the input circuit of the timing flip-flop T1. The clock pulse signal at the end of step 2 now causes the character 1 signals on the sum lines 93 to be stored in the B field length register 26 and in the B operand register 32, the timing flip-flop T1 to be set to represent a digit 1, and the command character register 14 is set into state 1.

The command character register 14 is now in state 1 and program step 3 is entered. At the beginning of program step 3 the timing flip-flops T1, T2, F1 and F2 represent the digits 1, 0, 0, 0. The A and B operand registers 30 and 32 are storing the characters 0 and 1, the A and B field length registers 28 and 26 are storing the characters 0 and 1, the order register is storing a character 1 and the memory address register 16 is storing characters 0, 0, 0. Since both the timing flip-flop circuits F1 and F2 still represent a digit 0, the memory unit 42 again receives a read signal on the read command register line 90, causing the addresses in the command registers 12 and 14 to be used to address the storage location containing the A field length character 3. The A field length character 3 is now shifted out and stored in the C register 94. A store signal is now developed on the store line 158, to the A field length register 28, a set to state 8 signal is developed at the input circuit of the command character register 14 and a subtract signal is again developed on the subtract 1 line 182, a character 1 is now subtracted from the character 3 stored in the C register 94. The clock pulse signal at the end of step 3 causes the modified A field length character 2 signals developed on the sum lines 93 to be stored in the A field length register 28. Since the order register is storing a character 1, indicating an add operation, the clock pulse also sets the command character register 14 into state 8. It should be noted that if other orders were specified, a branch would have occurred at this point to the other types of orders such as multiply, divide, subtract, etc.

The beginning of program step 4 is now entered, and the timing flip-flops T1, T2, F1 and F2 represent the digits 1, 0, 0, 0, the A and B field length register 28 and 26 are storing the modified field length characters 2 and 1, the A and B operand registers 30 and 32 are storing the characters 0 and 1, respectively, and the memory address register 16 is storing the characters 0, 0, 0. A read signal is again developed on the read command register line 90 and since the command character register 14 is in state 8, the least significant character of the beginning address of the B operand, a character 3, is shifted out and stored in the C register 94. An add B field length signal is now developed on the add B field length line 184, to the adder circuit 88, causing the adder circuit 88 to add the modified field length character 1 stored in the B field length register 26 to the character 3 stored in the C register 94. A store signal is also developed on the store units line 113, to the memory address register 16, and a set to state 7 signal is developed at the input circuit of the command character register 14. The clock pulse signal at the end of step 4 causes the sum of the characters 3 and 1, a character 4, to be stored in the units section of the memory address register 16, and the command character register 14 to be set into state 7.

With the command character register 14 in state 7, the processor is still in program step 4. At this point, the timing flip-flop circuits T1, T2, F1 and F2 represent digits 1, 0, 0, 0 and the A and B field length registers 28 and 26 are storing the characters 2, 1, the A and B operand registers 30 and 32 are storing the characters 0, 1 and the memory address register 16 is storing the characters 0, 0, 4. A read signal is again developed on the read command register line 90 and since the command character register 14 is in state 7 the second character of the beginning address of the B operand, a character 0, is shifted out and stored in the C register 94. Signals are now developed on the add carry line 185, the store tens line 114 and the set to state 6 line at the input circuit of the command character register 14. The adder circuit 88 now adds the character 0 stored in the C register 94 to the carry-out from addition of the first character of the beginning address of the B operand to the modified B field length character. Since there was not a carry, the output signal of the adder circuit 88 is still a character 0. The following clock pulse signal causes the output signal of the adder circuit, a character 0, to be stored in the tens section of the memory address register 16 and the command character register 14 to be set to state 6.

During the following clock pulse of program step 4 the operation of the processor of FIG. 2 is similar to that during the clock pulse when the command character register 14 was in state 7, except that the command character register 14 is in state 6 and the third character of the beginning address of the B operand, a character 2, is now shifted out of the memory unit 42 and stored in the C register 94. The following clock pulse signal causes the F1 flip-flop to be set to represent a digit 1, and since there was no carry from the previous addition, the character 2 is stored in the hundreds section of the memory address register 16.

With the command character register 14 in state 6, and the timing flip-flop F1 represents a digit 1, program step 5 is now entered. At the beginning of program step 5, the timing flip-flops T1, T2, F1 and F2 represents the digits 1, 0, 1, 0, the A and B field length registers 28 and 26 are storing the modified field length characters 2, 1, the operand register 32 is storing the modified B field length character 1, and the memory address register 16 is storing the address characters 204. Since the timing flip-flops F1 and F2 represent digits 1, 0, a read signal is now developed on the read memory address line 91. The memory location 204 is now addressed and the least significant character of the A operand, a character 5, is shifted out and stored in the C register 94. A compare signal is also developed on the compare line 181 which causes the pulses cause the beginning address of the A operand register 32 to be compared with the modified A field length character stored in the A field length register 28. Since the modified A field length character is larger than the modified B field length character, a carry signal is developed on the carry line CL at the output of the adder circuit 88. This causes a set signal to the timing flip-flop T2. A buffer access signal is now developed causing a reset signal to be applied to the timing flip-flop F1 and the memory address register 16. The following clock pulse causes the character 5, stored in the C register 94, to be stored in the B operand register 32, the timing flip-flop T2 to be set, the timing flip-flop F1 to be reset, the command character register 14 to be set to state 5 and the memory address register 16 to be cleared.

The beginning of program step 6 is now entered and the timing flip-flops T1, T2, F1 and F2 represent the digits 1, 1, 0, 0; the A and B field length registers 28 and 26 are storing the modified A and B field length characters 2, 1 and the A and B operand registers 30 and 32 are storing characters 0, 5. Since the command character register 14 is now in state 5, the following three clock pulses causes the beginning address of the A operand 200 to be shifted out of the memory unit 42 and added to the magnitude of the modified A field length character 2, which is stored in the A field length register 28. The resultant operand address, a number 202, is stored in the memory address register 16. It should also be noted that at the third clock pulse the command character register 14 was in state 3 and the timing flip-flops F1 and F2 both represented digits 0. Therefore, the third clock pulse set the timing flip-flop F1.

The command character register 14 is now in state 3 and the timing flip-flops F1 and F2 represent digits 1, 0, and the beginning of program step 7 is entered. Similar to the program step 5, a read signal is now developed on the read memory address line 91 causing the memory unit 42 to be addressed using the A operand address stored in the memory address register 16. Since an address 202 is stored in the memory address register 16 the least significant character of the A operand, a character 8, is now shifted out of the memory unit 42 and stored in the C register 94. A store signal is now developed on the store line 169 to the A operand register 30 and a reset signal on the reset line 110 to the memory address register 16 and at the following clock pulse the A operand character 8 in the C register 94 is stored in the A operand register 30, the memory address register 16 is cleared, the timing flip-flop F1 is reset, and the command character register 14 is set into state 11.

The program step 8 is now entered. During the first clock period of program step 8, the timing flip-flop circuits T1, T2, F1 and F2 represent the digits 1, 1, 0, 0, the A and B field length registers 28 and 26 are now storing the modified A and B field length characters 2,1, the A and B operand registers 30 and 32 are storing the least significant operand characters 8, 5 and the member address register 16 is storing the characters 000. A read signal is now developed on the read command register line 90. Since the command character register 14 is now in state 11, the memory unit 42 shifts out the least significant character of the beginning address of the result field. This character, a character 5, is stored in the C register 94. Since the timing flip-flop T2 represents a digit 1, indicating that the A field is larger than the B field, and therefore is to be used for the length of the result field, an add signal is now developed on the add A field length line 183. The adder circuit 88 now adds the modified A field length character, a character 2, to the least significant character of the beginning address of the result, a character 5, which is stored in the C register 94. Signals corresponding to the sum of the two characters, a character 7, are now developed on the sum lines 93 out of the adder circuit 88. A store signal is also developed on the store units line 113 to the memory address register 16 and the following clock pulse causes the units section of the memory address register 16 to store the character 7 signals, developed on the sum lines 93. The command character register 14 is then set into state 10.

The operation of the processor during states 10 and 9 of the command character register 14 is similar to that during states 7 and 6, except that since the command character register 14 is in states 10 and 9, the second and third characters of the beginning address of the result field are shifted out of the memory unit 42 and stored in the tens and hundreds sections of the memory address register 16. During program step 8 when the command character register 14 is in state 9, both the timing flip-flop circuits F1 and F2 represent digits 0. Therefore, the clock pulse which caused the hundreds character of the result field, a character 2, to be stored in the hundreds section of the memory address register 16, sets both the timing flip-flops F1 and F2 to represent a digit 1.

Since the command character register 14 is in state 9 and the timing flip-flop circuits F1 and F2 both represent a digit 1, program step 9 is now entered. At the beginning of program step 9, the timing flip-flops T1 and T2 both represent a digit 1, the A and B field length registers 28 and 26 are storing the modified A and B field length characters 2, 1, the A and B operand registers 30 and 32 are storing the A and B operand characters 8, 5 and the memory address register 16 is storing the address 207. Referring to FIG. 5, the address 207 is the location where the least significant character of the result is to be stored. An add signal is now developed on the add line 180 causing the characters 8, 5, stored in the A and B operand registers 30 and 32, respectively, the be added. Signals corresponding to the result of the addition, a character 3, are developed at the output circuit of the adder circuit 88, along with a carry-out signal, since the sum of the two characters is greater than 9. Also during program step 9, a count down signal is developed on both the count down lines 159 and 155, to the A and B field length register 28 and 26, a reset signal is developed on the reset line 168, to the A and B operand registers 30 and 32, a store signal is developed on the store line 140 to the C register 94 and a reset signal is applied to the timing flip-flop T1. Also, since there is a carry level at the CL output circuit of the adder circuit 88, a set signal is applied to the carry flip-flop *Cal*. The following clock pulse than causes the timing flip-flops T1 and F1 to be reset to represent digits 0, the contents of the A and B operand registers 30 and 32 are cleared, the modified characters stored in the A and B field length registers 28 and 26 are decreased by one, and the C register 94 stores a result character 3. At the same time, the carry flip-flop *Cal* is set to represent a digit 1 for indicating that a carry is to be added to the following character pair of the operands to be added.

With the command character register 14 in state 9 and the timing flip-flop circuits F1 and F2 representing digits 0, 1, the beginning of program step 10 is entered. At this point the timing flip-flops T1 and T2 represent digits 0, 1, the carry flip-flop *Cal* represents a digit 1, the A and B field length registers 28 and 26 are storing modified field length characters 1, 0, and the A and B operand registers 30 and 32 are both storing a character 0, the memory address register 16 is storing the result address 207 and the C register 94 is storing the result character 3. At this point the buffer access gating circuit 69 develops a buffer access signal causing a set to state 0 to be applied to the timing flip-flops F1 and F2, a reset signal to be applied to the reset line 110 to the memory address register 16 and a write signal to be applied to the write memory address register 92 to the memory unit 42. The following clock pulse causes both the timing flip-flops F1 and F2 to be reset and the result character 3 to be stored in the memory address register 16. Since the modified B field length character stored in the B field length register 26 is not equal to 15, this clock pulse also sets the command character register 14 into state 8 and program step 4 is again entered. However, it should be noted that had the modified character stored in the B field length register 26 been equal to 15 and the modified field length character stored in the A field length register 28 not equal to 15, then the command character register 14 would have been set to state 5 and program step 6 would now be entered rather than program step 4.

During states 8, 7 and 6 of the command character register 14, the beginning address of the B operand is again shifted out of the memory unit 42, modified and stored back into the memory address register 16. It should be noted, however, that the modified B field length character stored in the B field length register 26 is now 0. Therefore, the beginning address of the B operand, address 203, is stored in the memory address register 16 without modification. With reference to FIG. 5, it will be noted that the memory address 203 contains a character 6, which is the next character of the B operand. Therefore, when the read signal is developed on the read memory address register line 91, it causes the character 6 to be stored in the C register 94, which is subsequently stored in the B operand register 32.

The clock pulse signal which caused the character 6 to be stored in the B operand register 32 also sets the command character register 14 into state 5, causing the processor to enter program step 6. During program step 6 the command character register steps through the states 5, 4 and 3, during which the beginning address of the A operand, address 200, is shifted out of the memory unit 42 and added to the modified A field length character, a character 1. The modifier beginning address of the A operand, address 201, is now stored in the memory address register 16. With reference to FIG. 5, it will be noted that the second character of the A operand, a character 7, is stored in the memory location 201.

At the beginning of program step 7, the command character register 14 is in state 3 and the timing flip-flop circuits F1 and F2 represent digits 1, 0. During program step 7, the A operand character is shifted out of the memory unit 42, stored in the C register 94 and subsequently stored in the A operand register 30.

The operation of the processor during program step 8, as the command character register 14 steps through states 11, 10 and 9, is similar to that described above. During program step 8, the beginning address of the result field, address 205, is again shifted out of the memory unit 42, and since the timing flip-flop T2 still represents a digit 1, indicating that the A field length character is to be used, the modified field length character stored in the A field length register 28, a character 1, is added to the address 205, the resulting address, address 206, is then stored in the memory address register 16.

At the beginning of program step 9, the command character register 14 is in state 9 and the timing flip-flops T1, T2, F1 and F2 represent the digits 0, 1, 1, 1. The A and B field length registers 29 and 26 are now storing modified field length characters 1, 0, the A and B operand registers 30 and 32 are storing the operand characters 7, 6 and the memory address register 16 is storing the memory address 206. Since the carry flip-flop *Cal* is still true, indicating that there was a carry-out from the addition of the previous characters of the operands, the add signal applied to the add line 180 causes the characters 6, 7 and 1 to be added together and the result with the indication of a carry level developed at the output of the adder circuit 88. The clock pulse signal at the end of program step 9 causes the result character, a character 4, to be stored in the C register 94 and the A and B field length characters in the A and B field length registers 28 and 26 to be decreased by one. Since there is a carry-out, the carry flip-flop *Cal* is not reset and still represents a digit 1.

During program step 10 (not shown in FIG. 6) the character 4, stored in the C register 94, is stored in the memory address location 206. Since the modified B field length character, stored in the B field length register 26 is now a number 15, the command character register 14 is set to state 5 causing the processor to enter program step 6, rather than step 4, as is the case when the modified B field length character is not equal to 15 and discussed hereinabove. During program step 6 the modified character stored in the A field length register 28 is a character 0 and, therefore during program step 6 the beginning address of the A operand, address 200, is shifted out without modification and stored in the memory address register 16.

At the beginning of program step 7, the memory address register 16 is storing the address 200 and since the program steps 4 and 5 were skipped, the B operand character in the B operand register is 0. Also, since there was a carry from the previous operand character addition, the carry flip-flop *Cal* represents a digit 1. Referring to FIG. 5, the memory address location 200 contains the next character of the A operand. Therefore, during program step 7 this character, a character 1, is shifted out of the memory unit 42 and stored in the A operand register 30. During the program step 8 the three characters of the beginning address of the result field are again shifted out of the memory unit, added to the modified character stored in the A field length register 28, which is now 0, and stored in the memory address register 16.

At the beginning of program step 9, the A and B field length registers 28 and 26 are storing the characters 0, 15. The A and B operand registers 30 and 32 are storing operand characters 1, 0 and the carry flip-flop *Cal* represents a digit 1, indicating a carry from the addition of the previous operand characters. During program step 9 the adder circuit 88 adds the operand characters 1, 0 together, taking into account the carry signal and the clock pulse signal at the end causes the result, a character 2, to be stored in the C register 94 and the A field length register 28 to be counted from 0 to 15. During program step 10, the result character 2 stored in the C register 94 is written into the memory location 205, as specified by the memory address register 16, and since both the modified A and B field length characters are equal to 15, the command character register 14 is set to state 15.

With the command character register in state 15, the program step 11 is now entered where the command specified by the command address register 12 is increased by one, for specifying the next command and the timing flip-flops T2, T1, F2 and F1 are all reset, and the A and B field length registers 28 and 26 are reset and the command character register 14 is set to state 0. Program step 1 is again entered, wherein the next command as specified by the command address register 12, is shifted out and stored in the order register 18 for use in executing the next command.

With the operation of the data processor of FIG. 2 in mind during the program steps 1 through 11, a detailed description will now be given of its operation during the program steps 12 through 14. The program steps 12, 13 and 14 are only entered when new data signals are to be shifted in from the source of data signals 34 and stored in the buffer unit 96. A buffer access permitted signal is developed by the buffer access gating circuit 69 during the program steps 5, 10 and 11. It is only at these points in the execution of a command that branching is allowed to the program steps 12, 13 and 14 for storing the new data signals. Referring now to FIGS. 8A and 8B, assume that the four characters indicated on the punched card 206 are to be read by the punched card reader 218 and stored in the buffer unit 96. As indicated, the four characters in the order in which they will be read are 3, 6, 2 and 5.

In the following description of a buffer access, reference will be made to FIG. 7, which is a timing diagram showing the states of the flip-flops F1, F2, R1, R2 and M8. FIG. 7 also shows the states of the command character register 14, the contents of the units section of the memory address register 16, the contents of the buffer address location 97 and the contents of the C register 94.

Assume now that the punched card reader 218 has read the character 3 from the punched card 206 and is providing binary coded decimal output signals corresponding thereto. The reader access timing flip-flop R1 will now represent a digit 1. When the processor enters either the program step 5, 10 or 11 a buffer access permitted signal will be developed by the buffer access gating circuit 69 (see FIG. 3D). Since the reader access flip-flop R1 represents a digit 1, the clock pulse at the end of program steps 5, 10 or 11 will cause the reader access timing flip-flop R2 and the M8 flip-flop of the memory address register 16 to be set to represent a digit 1. It should be noted that this same clock pulse will set the command character register 14 into its next state for carrying out the next step of operation. Therefore, if the command character register 14 was in state 6, it may be set to either of the states 5 or 11, or if the command character register 14 was in state 9 it may be set to any of the states 5, 8 or 15, or if the command character register were in state 15, it will be set to state 0. However, since the timing flip-flop R2 was triggered to represent a digit 1, the inhibit gates 44 (see FIG. 3A) will inhibit the *r0*, *r5*, *r8*, *r11* and *r15* outputs of the command character register 14 and the program step 12 is now entered.

At the beginning of program step 12, the timing flip-flops F1, F2, R1, R2 and M8 represents the digits 1,0,1,1,1 and the units section of the memory address register 16 is storing a character 0. Assume initially, that the address in the buffer address section 97 of the buffer unit 96 is 0. During program step 12 a read signal is developed on the read buffer access line 100 and since the M8 flip-flop of the memory address register 16 represents a digit 1, the address character 0 is read out of the buffer address section 97 and stored in the C register 94. A reset signal is now developed on the reset line 95 to the timing flip-flop R1, a store signal is developed on the store data line 141 to the C register 94 and a store signals is developed on the store units line 116 to the memory address register 16. Also, an add signal is developed on the add 1 line 186, causing the adder circuit 88 to add one to the character 0 in the C register 94. The clock pulse signal at the end of program step 12 sets the flip-flop circuits F1 and F2 to represent digits 0,1, stores the character 1, the incremented buffer address, in the C register 94 and shifts the character 0, the buffer address, stored in the C register 94, into the units section of the memory address register 16.

With the flip-flop circuits F1, F2 and M8 representing digits 0,1,1, program step 13 is entered. The buffer address section of the buffer unit 96 and the units section of the memory address register 16 are now both storing a character 0. A reset signal is now being developed on the reset M8 line 111, a store signal is developed on the store data line 141 to the C register 94 and a write signal is developed on the write line 98 to the buffer unit 96. The clock pulse signal at the end of program step 13 resets the M8 flip-flop, stores data character 3, developed by the source of data signals 34, into the C register 94 and since the M8 flip-flop represents a digit 1, the incremented buffer address, the next buffer address, is written in the buffer address section 97 of the buffer unit 96.

With the flip-flops F1, F2, and M8 representing digits 0,1,0, program step 14 is now entered. During program step 14 a reset signal is developed at the input of the timing flip-flop R2 and a write signal is again developed on the write line 98. It should be noted that by this time the flip-flop R1 has been reset. The clock pulse signal at the end of program step 14 resets the flip-flop circuits F1, F2 and R2 to represent a digit 0 and writes the character 3, stored in the C register 94, into the number 0 address location of the buffer unit 96 as addressed by the units section of the memory address register 16.

The processor of FIG. 2 now enters the program step corresesponding to the state of command character register 14. It should now be evident that when the next character, a character 6, is read from the punched card 206 by the punched card reader 218 and there is a character to be read by the processor of FIG. 2, the reader access flip-flop R1 will again be set by the punched card reader 218. The next point in the program steps, at which a buffer access permitted signal is developed, will cause the processor to again branch out into steps 12, 13 and 14, where the character 6 will be read and stored into the buffer address location number 1 of the buffer unit 96. The branching continues with each subsequent character read by the punched card reader 218 until all of the characters 3, 6, 2 and 5 are stored in the buffer addresses 0 through 3, respectively, of the buffer unit 96.

Although the gating circuits of FIG. 3 are arranged for only storing four character at a time in the buffer unit 96, it should be understood that punched cards normally are arranged for storing eighty characters of information. Therefore, it is desirable for the processor of FIG. 2 to read eighty characters of information and store them in the buffer unit 96 before transferring the data signals from the buffer unit 96 to the memory unit 42. Such a rearrangement of the processor of FIG. 2 may be made by increasing the length of the character in the memory unit 42, and the length of the C register 94. The added bits of the buffer address stored in the C register 94 during program step 12 may be then stored in the tens section of the memory address register 16. Such a rearrangement of the elements of FIG. 2, with the addition of the appropriate gating circuits of the gating circuits 40 of the signal generator 36, will allow more than four characters to be read and stored in the buffer unit 96 before being shifted into the memory unit 42.

It should be noted that processed data characters may be shifted out of the memory unit 42 and stored in the buffer unit 96 under control of a separate command. Then, when enough data characters are stored in the buffer unit 96, the execution of commands may be interrupted for reading out data characters to peripheral units similar to the writing of new data characters as described above.

In summary, the processor of FIG. 2 will go through program steps 1, 2 and 3 regardless of the command to be executed. At the end of program step 3 branching will occur, depending on the type of operand which was shifted out during the three previous program steps. If an add command is stored in the order register 18, program step 4 is entered. If a subtract, multiply, divide or other type of command is stored in the order register 18, other program steps will be entered at this point.

However, regardless of the type of operation, operands are processed a character at a time and the partial result stored before the next characters of the operands are procesed. Assuming that an add order is stored in the order register 18, program steps 4 and 5 will then be entered. During the program steps 4 and 5, the three characters of the B operand address are shifted out of the storage means 10, modified by the modified B field length character stored in the B field length register 26 and stored into the memory address register 16. The character of the B operand in the address location specified by the memory address register 16 is then shifted out of the storage means 10 and stored in the B operand register 32.

At this point, three different program steps may be entered, program steps 6, 8 or 12. Since a buffer access permitted signal is developed at this point, steps 12, 13 and 14 may be entered during which new data characters are stored in the buffer unit 96, causing an interruption of the execution of the command specified by the order register 18. If the source of data signals 34 does not have characters ready for the processor of FIG. 2 to read and the reader access flip-flop R1 represents a digit 0, then either program step 6 or 8 will be entered, depending on whether the A field length character is not equal to 15 or is equal to 15, respectively. If the A field length character stored in the A field length register is equal to 15, this indicates that the length of the A operand was equal to 0 and, therefore, the program steps 6 and 7 may be skipped, since no operand character need be shifted out of the memory unit 42. However, if the length of the A field length character is not equal to 15, indicating that there is one or more characters in the A operand, then the program steps 6 and 7 will be entered whereby the three characters of the beginning address of the A operand are shifted out of the storage means 10, modified by the modified field length character stored in the A field length register 28 and stored in the memory address register 16. Also, the first character of the A operand is shifted out of the storage means 10 and stored in the A operand register 30. The program steps 8, 9 and 10 are then entered during which the three characters of the beginning address of the result are shifted out of the storage means 10, modified by the larger of the two A and B field length characters, and stored in the memory address register 16. The A and B operand character pair, stored in the A and B operand registers 30 and 32, are then added and the result is stored back into the memory unit 42. At this point a buffer access permitted signal is again generated which allows the program steps 12, 13 and 14 to be entered and new data signals read and stored in the buffer unit 96. If, however, there are not data signals at the output of the source of data signals 34 to be read, one of three other program steps will be entered. If the modified B field length character stored in the B field length register 26 is equal to 15, indicating that all characters of the B operand have been processed, but the modified A field length character stored in the A field length register 28 is not equal to 15, indicating that there are other A operand characters to be processed, then the program steps 4 and 5 are skipped and the program steps 6 through 10 are again entered. If, however, the modified B field length character is not equal to 15, which indicates that there are other B operand characters to be processed, program steps 4 and 5 are again entered, as discussed above. If the modified A and B field length characters both equal 15, program step 11 is entered. During program step 11 the state of the command address register 12 is counted up one so that the next command will be addressed by the command register 12. At this point a buffer access permitted signal is again developed and if a new data character is ready to be read from the output of the source of data signals 34, the reader access cycle of the program steps 12, 13 and 14 are entered. If, however, the source of signals 34 does not have new data signals to be read by the processor, then program step 1 will be entered directly from program step 11. It should further be understood that the field length characters may be used in other types of commands. For example, in a multiply command the sum of the two field length characters may be used to designate the length of the field. Also, the field length characters may be used for keeping track of the number of characters compared in a comparison command.

It should be noted that although the decimal field length characters have been described as being decreased by 1 by the adder circuit 88, this is not a limitation upon the invention but other arrangements using gating circuits, for example, may be employed. Also, other means may be employed than the adder circuit 88 for modifying the beginning addresses of operand and result fields.

What is claimed is:

1. In a variable field length digital computer having an internal organization for processing information composed of characters, the memory and associated addressing system therefor comprising:

(a) addressable memory means for storing variable field length operands and commands composed of characters, the commands having characters representing the addresses of end characters of first and second operands, the field length of said first and second operands, and the address for storage of an end character of a result field;

(b) command addressing means for selectively addressing the characters of the commands stored in the memory means, the command addressing means being characterized as selectively and repeatedly addressing at least the addresses in the commands;

(c) means for reading out of the memory means the characters of commands addressed by the command addressing means;

(d) means for selectively counting relative to the magnitude of the field length characters read out of the memory means in a pre-determined sequence, the states of the counting means defining values which combined with the operand and result end addresses form the addresses of the individual characters of corresponding operands and addresses of characters in the corresponding result field in a predetermined sequence in accordance with the type of processing operation to be performed;

(e) means for selectively and sequentially combining the end operand and result addresses read out of the memory means with the value represented by the states of the counting means and for forming modified addresses of the individual characters of corresponding operands stored in the memory means and modified addresses of characters in the corresponding result fields of the memory means;

(f) memory address means for storing the modified addresses in sequence as they are formed;

(g) means for reading out of the memory means the operand characters for processing specified by the stored modified operand addresses; and (h) means for writing any result characters applied thereto in the addresses of the memory means specified by the modified result addresses stored in the memory address means.

2. In a variable field length digital computer having an internal organization for processing information composed of characters, the memory and assocaited addressing system therefor comprising:

(a) addressable memory means for storing variable field length operands and commands composed of characters, the commands having characters representing the addresses of end characters of first and second operands, the field length of said first and second operands, and the address for storage of an end characters of a result field;

(b) command addressing means for selectively addressing the characters of the commands stored in the memory means, the command addressing means being characterized as selectively and repeatedly addressing at least the addresses in the commands;

(c) means for reading out of the memory means the characters of commands addressed by the command addressing means;

(d) means for storing the field length characters read out of the memory means including means for selectively modifying the field length represented by the field length characters stored in the storing means in a pre-determined sequence thereby defining modified field length values which combined with the operand and result end addresses form the addresses of the individual characters of corresponding operands and addresses of characters in the corresponding result field in a pre-determined sequence dependent on the type of processing operation to be performed;

(e) means for selectively and sequentially combining the end operand and result addresses read out of the memory means with the contents of the field length storing means and for forming modified addresses of the individual characters of corresponding operands stored in the memory means and modified addresses of characters in the corresponding result fields of the memory means;

(f) memory address means for storing the modified addresses in sequence as they are formed;

(g) means for reading out of the memory means the operand characters for processing specified by the stored modified operand addresses; and (h) means for writing any result characters applied thereto in the addresses of the memory means specified by the modified result addresses stored in the memory address means.

3. In a variable field length digital computer having an internal organization for processing information composed of characters, the arithmetic system therefor comprising:

(a) addressable memory means for storing variable field length operands and commands composed of characters, the commands having characters representing the addresses of end characters of first and second operands, the field length of said first and second operands, and the address for storage of an end character of a result field;

(b) command addressing means for selectively addressing the individual characters of the commands stored in the memory means, the command addressing means being characterized as selectively re-addressing at least the addresses in each command;

(c) means for reading out of the memory means the characters of commands addressed by the command addressing means;

(d) means for storing the field length characters of the same command read out of the memory means;

(e) means for selectively modifying the magnitude of each stored field length character in a pre-determined sequence, the modified field length characters representing values which combined with the operand and result end addresses form the addresses of the individual characters of corresponding operands and addresses of characters in the corresponding result field in a predetermined sequence dependent on the type of arithmetic operation to be performed;

(f) means for selectively and sequentially combining the end operand and result addresses read out of the memory means with the modified field length character and for forming modified addresses of the individual characters of corresponding operands stored in the memory means and modified addresses of characters in the corresponding result fields of the memory means;

(g) memory address means for storing the modified addresses in sequence as they are formed;

(h) means for reading out of the memory means the operand characters for processing specified by the stored modified operand addresses;

(i) means for concurrently storing a character of each of two operands being read out of the memory means;

(j) means for combining the two stored operand characters together and for forming a partial result character and any resulting carry;

(k) means for storing a signal corresponding to a carry from the combining means, said combining means further being responsive to a stored carry signal for selectively combining a carry with operand characters combined subsequent to the forming of the carry to form complete partial result characters; and (l) means for writing the partial result characters in the addresses of the memory means specified by the modified result addresses stored in the memory address means.

4. In a variable field length digital computer having an internal organization for processing information composed of characters, the arithmetic system therefor comprising:

(a) addressable memory means for storing variable field length operands and commands composed of characters, the commands having characters representing the addresses of end characters of first and second operands, the field length of said first and second operands, and the address for storage of an end character of a result field, each of said addresses being represented by a plurality of characters;

(b) command addressing means for selectively addressing the individual characters of the commands stored in the memory means, the command addressing means being characterized as selectively re-addressing at least the addresses in each command;

(c) means for reading out of the memory means the characters of commands addressed by the command addressing means a character at a time;

(d) means for storing the field length characters of a command read out of the memory means;

(e) means for selectively modifying the magnitude of each stored field length character in a pre-determined sequence, the modified field length character representing values which combined with the operand and result end addresses form the addresses of the individual characters of corresponding operands and addresses of characters in the corresponding result field in a predetermined sequence dependent on the type of arithmetic operation to be performed;

(f) means for selectively and sequentially combining the first character of each end operand and result address read out of the memory means with the values represented by the modified field length characters and for forming a modified address character for each address, along with any resulting carry out from the operation of combining, said combining means being arranged for combining a carry out from the combining of the first character of an address read out of the memory means with the rest of the same address and for forming a modified address composed of modified address characters which represent the address of a character of storage in the memory means;

(g) memory address means for storing each of the modified address characters in the sequence in which they are formed;

(h) means for reading the operand characters out of the memory means specified by the modified operand addresses stored in the memory address register means;

(i) means for concurrently storing a character of each of two operands being read out of the memory means;

(j) means for combining the two stored operand characters together and for forming a partial result character and any resulting carry;

(k) means for storing a signal corresponding to a carry from the combining means, said combining means further being responsive to a stored carry signal for selectively combining a carry with operand characters combined subsequent to the forming of the carry to form complete partial result characters; and (l) means for writing the result characters in the storage locations of the memory means specified by the modified result addresses stored in the memory address means.

5. A variable field length digital computer as defined in claim 4 wherein said means for storing modified addresses comprises an electronic storage register having a separate section for storing each of the characters of one of the modified addresses in sequence as formed.

6. In a variable field length digital computer having an internal organization for processing information composed of characters, the arithmetic system therefor comprising:

(a) addressable memory means for storing variable field length operands and commands composed of characters, the commands having characters representing the addresses of end characters of first and second operands, the field length of said first and second operands, and the address for storage of an end character of a result field, each of said addresses being represented by a plurality of characters;

(b) command addressing means for selectively addressing the individual characters of the commands stored in the memory means, the command addressing means being characterized as selectively re-addressing at least the addresses in each command;

(c) means for reading out of the memory means the characters of commands addressed by the command addressing means a character at a time;

(d) means for storing the field length characters of the same command read out of the memory means and for selectively counting relative to the magnitude of the field length characters in a pre-determined sequence, the states of the storing and counting means defining values which combined with the operand and result end address form the addresses of the individual characters of corresponding operands and addresses of characters in the corresponding result field in a predetermined sequence dependent on the type of arithmetic operation to be performed;

(e) means for selectively and sequentially combining the first charcter of each end operand and result address read out of the memory means with the value represented by the state of the storing and counting means and for forming a modified address character for each address along with any resulting carry out from the combining means, said combining means being arranged for combining a carry out from the combining of the first character of an address read out of the memory means with the rest of the same address and for forming a modified address composed of modified address characters which represent the address of a character of storage in the memory means;

(f) memory address register means having individual sections for storing each of the modified address characters in the sequence in which they are formed;

(g) means for reading the operand characters out of the memory means specified by the modified operand addresses stored in the memory address register means;

(h) means for concurrently storing a character of each of two operands being read out of the memory means;

(i) means for combining the two stored operand characters together and for forming a partial result character and any resulting carry;

(j) means for storing a signal corresponding to a carry from the combining means, said combining means further being responsive to a stored carry signal for selectively combining a carry with operand characters combined subsequent to the forming of the carry to form a complete partial result character; and (k) means for writing the result characters in the storage location of the memory means specified by a modified result address stored in the memory address means.

7. A variable field length digital computer as defined in claim 6 wherein said memory means comprises a coincident current core memory unit and wherein the commands stored therein contain three characters for each address thereof, said means for combining address characters with the value represented by the state of the storing and counting means comprising a full adding circuit arranged for adding a complete character substantial simultaneously to the value represented by the state of the storing and counting means.

8. In a variable field length digital computer having an internal organization for processing information composed of characters, the adding system therefor comprising:

(a) addressable memory means for storing variable field length operands and commands composed of characters, the commands having characters representing the addresses of end characters of first and second operands, the field length of said first and second operands, and the address for storage of an end character of a result field, each of said addresses being represented by a plurality of characters;

(b) command addressing means for selectively addressing the individual characters of the commands stored in the memory means, the command addressing means being characterized as selectively re-addressing at least the addresses in each command;

(c) means for reading out of the memory means the characters of commands addressed by the command addressing means a character at a time;

(d) means for storing the field length characters of the same command;

(e) means for selectively modifying the magnitude of the individual stored field length characters in a predetermined sequence, the modified field length characters representing values which combined with the operand end addresses form the addresses of individual characters of corresponding operands and addresses of characters in the corresponding result field in a predetermined sequence dependent on the type of arithmetic operation to be performed;

(f) full adding circuit means for selectively and sequentially combining the first character of each end operand and result address read out of the memory means with the value represented by the modified field length characters and for forming a modified address character for each address, along with any resulting carry out from the operation of combining;

(g) means for storing a signal corresponding to a carry from the full adding circuit means, said full adding circuit means being responsive to a stored carry signal from the combining of the first character of an address read out of the memory means for combining a carry with the rest of the same address and for forming a modified address composed of modified address characters which represent the address of a character of storage in the memory means;

(h) memory address means for storing each of the modified address characters in the sequence in which they are formed;

(i) means for reading the operand characters out of the memory means for processing as specified by the modified operand addresses stored in the address register means;

(j) means for concurrently storing a character of each of two operands being read out of the memory means, said full adding circuit means also being arranged for combining the two stored operand characters together and for forming a partial result character and any resulting carry, said full adding circuit means further being responsive to a stored carry signal from the combining of operand characters for selectively combining a carry with operand characters combined subsequent to the forming of the carry to form a complete partial result character; and (k) means for writing the partial result characters in the storage locations of the memory means specified by the modified result addresses stored in the memory address means until a complete result composed of partial result characters is stored in a result field of the memory means.

9. In variable field length digital computer having an internal organization for processing information composed of characters, a character of the operands at a time, including a pair of operand registers for storing a pair of operand characters to be processed and a processing means for combining each different pair of operand characters stored in the operand registers and for forming a partial result character and any resulting carry corresponding to the combination, the memory and addressing system therefor comprising:

(a) a memory means for storing operands and commands both of which are composed of characters, the memory means having individually addressable storage locations for storing the characters, the commands each having characters representing the address of an end character of first and second operands, the field length of said first and second operands, and the address for storage of an end character of the result in a result field;

(b) memory address register means for storing the address of a single character in the memory means;

(c) command address register means capable of forming addresses representing a single command character memory address;

(d) means connected for reading and writing a character at a time in the storage location of the memory means specified by the address contained in the memory and command register means;

(e) means for storing each of the two field length characters of a command read out of the memory means and including means for selectively modifying the magnitude of the field length characters stored in the field length storing means;

(f) means for selectively combining the characters contained in the field length storing means with the addresses read out of the memory means, and arranged for forming a modified address corresponding thereto, said memory address register means being connected for storing the modified addresses formed; and (g) electrical timing means for sequencing the operation of the aforementioned means including:

(1) timing means connected for causing the command register means to form the addresses of the individual characters of a command stored in the memory means, the command timing means being arranged for causing the command register means to repeatedly and selectively form addresses of the operand addresses and the result field address of the same command, (2) timing means connected for causing the reading and writing means to read out of the memory means the character of the command specified by the address contained in the command register means a character at a time, (3) timing means connected for causing the field length storing means to store both of the field length characters of a command read out of the memory means, the last mentioned timing means being connected for causing the modifying means to selectively modify the magnitude of the field length characters and form modified field length characters with each reading out of the operand and result addresses, each resulting modified field length character being of a magnitude such that combined with the corresponding end operand address the address of one of the characters of the corresponding operand is formed, (4) timing means connected for causing the combining means to combine the operand addresses read out of the memory means with the corresponding field length character then stored in the field length storing means and form modified operand addresses representing the addresses of characters of the corresponding operand, and connected for causing the memory register means to store the modified operand addresses individually and sequentially in the order formed, (5) timing means connected for causing the reading and writing means to read out of the memory means the character of an operand specified by each modified operand address contained in the memory register means, (6) timing means connected for causing the combining means to selectively combine the result address read out of the memory means together with the stored field length characters and form a modified result address representing the address for storage of a result character in the identified result field beginning with one of the ends of the result field, the last mentioned timing means also being connected for causing the memory register means to store each modified result address individually and sequentially in the order formed, and (7) timing means connected for causing the reading and writing means to write a partial result character presented thereto in the storage location of the memory means specified by the modified result address contained in the memory register means until a complete result composed of partial result characters is stored in the result field.

10. In a variable length digital computer having an internal organization for processing information composed of characters a character of the operands at a time, the processing system therefor comprising:

(a) memory means for storing operands and commands, both of which are composed of characters, the memory means comprising individually addressable storage locations for storing the characters the commands each having characters representing the address of end characters of first and second operands, the field length of said first and second operands, and the address for storage of an end character of the result in a result field;

(b) memory address register means characterized whereby it may only store the address of a single character in the memory means;

(c) command address register means characterized whereby it may only form addresses representing a single command character memory address;

(d) means connected for reading and writing in the storage locations of the memory means specified by the addresses contained in the memory register means and the command register means a character at a time;

(e) operand register means for storing a single character of each of two operands read out of the memory means;

(f) field length storing means for storing each of the two field length characters of a command read out of the memory means and including means for selectively modifying the magnitude of each of the individual field length characters stored in the field length storing means;

(g) processing means for combining characters stored in the field length storing means with address characters read out of the memory means and for combining operand characters stored in the operand register means;

(h) means for storing a signal corresponding to a carry out from the combining of the processing means; and (i) electrical timing means for sequencing the operation of the aforementioned means including:

(1) timing means connected for causing the command register means to assume states representing the addresses of the individual characters of a command stored in the memory means, the command timing means being arranged for causing the command register means to repeatedly and selectively form the addresses of the operand addresses and the result field address of the same command, (2) timing means connected for causing said reading and writing means to read out of the memory means the character of the command specified by the command register means a character at a time, (3) timing means connected for causing the field length storing means to store both of the field length characters of a command read out of the memory means, the last mentioned timing means being connected for causing the modifying means to selectively modify the magnitude of the field length characters and form modified field characters concurrently with each reading out of the operand and result addresses, each resulting modified field length character being of a magnitude such that when combined with the corresponding end operand address the address of one of the characters of the corresponding operand is formed, (4) timing means connected for causing the processing means to combine the operand addresses read out of the memory means with the corresponding field length character then stored in the field length storing means and form modified operand addresses representing the addresses of characters of the corresponding operand, and for causing the memory register means to store the modified operand addresses individually and sequentially in the order formed, (5) timing means connected for causing the reading means to read out of the memory means the character of an operand specified by each modified operand address stored in the memory register means and connected for causing the operand storing means to store the operand character read out of the memory means, (6) timing means connected for causing the processing means to selectively combine each result address read out of the memory means together with the stored field length characters and form modified result addresses representing the addresses for storage of result characters in the identified result field beginning with one of the ends of the result field, the last mentioned timing means also being connected for causing the memory register means to store each modified result address individually and sequentially in the order formed, (7) timing means connected for causing the processing means to combine the two operand characters stored in the operand storing means together and form a partial result character, the last mentioned timing means additionally being connected for causing the carry storing means to store a signal corresponding to a carry out resulting from the combining of the two operand characters and connected for causing the processing means to combine the operand characters with a carry in response to a previously stored carry signal, and (8) timing means connected for causing the reading and writing means to write each partial result character in the storage location of the memory means specified by the corresponding modified result address contained in the memory register means concurrently with the forming of the partial result character until a complete result composed of partial result characters is stored in the result field.

11. In a variable field length digital computer having an internal organization for processing information composed of characters a character of the operands at a time, the adding system therefor comprising:

(a) memory means for storing operands and commands, both of which are composed of characters, the memory means comprising individually addressable storage locations for storing the characters, the commands each having characters representing the address of one of end characters of first and second operands, the field length of said first and second operands, and the address for storage of an end character of the result in a result field;

(b) memory address register means characterized whereby it may only store a single address of a single character in the memory means at a time;

(c) command address register means characterized whereby it may only store a single address representing a single command character memory address at a time;

(d) means connected for reading and writing in the storage locations of the memory means specified by the addresses contained in the memory register means and the command register means a character at a time;

(e) operand register means for storing a single character of each of two operands read out of the memory means;

(f) field length storing means for storing each of the two field length characters of a command read out of the memory means and including means for substantially concurrently modifying the magnitude of each of the read out field length characters stored therein;

(g) processing means for combining characters stored in the field length storing means with address characters read out of the memory means and for combining operand characters stored in the operand register means;

(h) means for storing a signal corresponding to a carry out from the combining of the processing means; and (i) electrical timing means for sequencing the operation of the aforementioned means including:

(1) command timing means connected for causing said command register means to assume states representing the addresses of the individual characters of a command stored in the memory means, the command timing means being arranged for causing the command register means to selectively form the addresses of the operand addresses and the result field address of the same command at least once for each character of the larger of the two operands specified by the command;

(2) command timing means connected for causing the reading and writing means to read out of the memory means the character of the command specified by the command register means, (3) timing means connected for causing the field length storing means to store both of the field length characters read out of the memory means and connected for causing said modifying means to selectively modify the magnitude of the field length characters and thereby form a modified field length character for both of the field length characters concurrently with each reading out of the operand and result addresses, the resulting series of modified field length characters being of a magnitude such that when combined with the corresponding end operand addresses the addresses of each of the characters of the operands are formed beginning with the least significant character thereof, (4) timing means connected for causing the processing means to combine the operand addresses read out of the memory means with the corresponding field length character stored in the field length storing means and form modified operand addresses representing the addresses of characters of the corresponding operand beginning with the least significant character thereof, and connected for causing the memory register means to store each of the modified operand addresses individually and sequentially in the order formed, (5) operand timing means connected for causing the reading means to read out of the memory means the character of an operand specified by each modified operand address stored in the memory register means and connected for causing the operand storing means to store the operand characters read out of the memory means, (6) timing means connected for causing the processing means to combine each result address read out of the memory means with the larger of the two stored field length characters and form modified result addresses representing the addresses for storage of result characters in the identified result field beginning with the address for storage of the least significant result character, the last mentioned timing means also being connected for causing the memory register means to store each of the modified result addresses individually and sequentially in the order formed, (7) timing means connected for causing the processing means to combine the two operand characters stored in the operand storing means together and form a partial sum character, the last mentioned means additionally being arranged for causing the carry storing means to store an indication of any carry out resulting from the combining of the two operand characters, and connected for selectively causing the processing means to combine the operand characters with a carry in response to a previously stored carry signal, and (8) timing means connected for causing the reading and writing means to write each partial sum character in the storage location of the memory means specified by the corresponding modified result address contained in the memory register means after the forming of the partial sum character until a complete result composed of partial sum characters is stored in the result field.

12. In a variable field length digital computer having an internal organization for processing information composed of characters a character of the operands at a time, the adding system therefor comprising:

(a) memory means for storing operands and commands, both of which are composed of characters, the memory means comprising individually addressable storage locations for storing the characters, the operands being arranged with characters of increasing order of magnitude in storage locations of the memory means bearing decreasingly numbered addresses, the commands each having characters representing the address of the most significant characters of first and second operands, the field length of said first and second operands, and the address for storage of the most significant character in a result field;

(b) memory address register means characterized whereby it may only store a single address of a single character in the memory means at a time;

(c) command address register means characterized whereby it may only store a single address representing a single command character memory address at a time;

(d) means connected for reading and writing in the storage locations of the memory means specified by the addresses contained in the memory register means and the command register means a character at a time;

(e) operand register means for storing a single character of each of two operands read out of the memory means;

(f) field length storing means for storing each of the two field length characters of a command read out of the memory means, and including means for substantially concurrently modifying the magnitude of each of the read out field length characters stored therein;

(g) processing means for combining characters stored in the field length storing means with address characters read out of the memory means and for combining operand characters stored in the operand register means;

(h) means for storing a signal corresponding to a carry out from the combining of the processing means; and (i) electrical timing means for sequencing the operation of the aforementioned means including:

(1) timing means connected for causing the command register means to assume states representing the addresses of the individual characters of a command stored in the memory means in the order defined as follows: the field length characters, the addresses of the operands and the address of a result field, the last mentioned timing means being arranged for causing the command register means to selectively form the addresses of the operand addresses and result field address of the same command at least once for each character of the larger of the two operands specified by the command;

(2) timing means connected for causing the reading and writing means to read out of the memory means the character of the command specified by the command register means a character at a time, (3) timing means connected for causing the processing means to subtract one unit from the field length characters read out of the memory means and form modified field length characters corresponding thereto, (4) timing means connected for causing the field length storing means to store the modified field length characters of a command read out of the memory means, (5) timing means connected for causing the processing means to add each operand address read out of the memory means to the corresponding stored field length character, to form modified operand addresses representing the addresses of characters of the corresponding operand beginning with the least significant character thereof, and for causing the memory register means to store the modified operand addresses individually and sequentially in the order formed.

(6) timing means connected for causing the reading means to read out of the memory means the character of an operand specified by each modified operand address stored in the memory register means and connected for causing the operand storing means to store the operand characters read out of the memory means.

(7) timing means connected for causing the processing means to add each result address read out of the memory means to the larger of the two stored field length characters and form modified result addresses representing the addresses for storage of result characters in the corresponding result field beginning with the address for storage of the least significant result character, and for causing the memory register means to store each modified result address individually and sequentially in the order formed, (8) timing means connected for causing the processing means to combine the two operand characters together stored in the operand storing means and form a partial sum character, the last mentioned timing means additionally being connected for causing the carry storing means to store a signal corresponding to any carry out resulting from the combining of the two operand characters and for causing the processing means to selectively combine the stored operand characters with a carry in response to a previously stored carry signal, (9) timing means connected for causing the reading and writing means to write each partial sum character in the storage location of the memory means specified by the corresponding modified result address which is contained in the memory register means after the forming of the partial sum character, and

(10) timing means connected for selectively causing the modifying means to decrease the magnitude of the stored field length characters one unit concurrently with the writing of each partial sum character and thereby cause each subsequent modified operand address formed to be the address of the next most significant operand character and also cause each subsequent modified result address formed to be the address for storage of the next most significant character of the result until a complete result composed of partial sum characters is stored in the result field.

13. In a variable field length digital computer having an internal organization for processing information composed of characters a character of the operands at a time, the adding system therefor comprising:

(a) memory means for storing operands and commands, both of which are composed of characters, the memory means comprising individually addressable storage locations for storing the characters, the operands being arranged with characters of increasing order of magnitude in storage locations of the memory means bearing decreasingly numbered addresses, the commands each having characters representing the address of the most significant characters of first and second operands, the field length of said first and second operands, and the address for storage of the most significant character in a result field;

(b) means for reading out of the memory means the field length characters of a command a character at a time;

(c) means for decreasing the magnitude of the read out field length characters one unit and for forming modified field length characters corresponding thereto;

(d) means for separately storing each modified field length character external of the memory means;

(e) means for reading out of the memory means the address for the first one of the two operands contained in the same command;

(f) means for adding the read out address for the first one of the two operands to the corresponding modified field length character to form a modified first operand address representing the address of the least significant character of the first operand;

(g) means for storing the modified first operand address external of the memory means;

(h) means for reading out of the storage location of the memory means the least significant first operand character specified by the modified first operand address;

(i) means for storing the least significant first operand character external of the memory means;

(j) means for reading out of the memory means the address for the second one of the two operands contained in the same command;

(k) means for adding the read-out address for the second one of the two operands to the corresponding modified field length character to form a modified second operand address representing the address of the least significant character of the second operand;

(l) means for storing the modified second operand address external of the memory means;

(m) means for reading out of the storage location of the memory means the least significant second operand character specified by the modified second operand address;

(n) means for storing the read out least significant second operand character external of the memory means;

(o) means for comparing the modified field length characters and for storing an indication of the larger of the two;

(p) means for reading out of the memory means the address for the result field contained in the same command;

(q) means for adding the modified field length character identified by the stored indication to the read out result address and for forming a modified result address representing the address of the least significant storage location of the result field;

(r) means for storing the modified result address external of the memory means;

(s) means for adding the stored least significant operand characters together to form a result character and any resulting carry;

(t) means for storing an indication of any carry;

(u) means for writing the result character in the storage location of the result field of the memory means specified by the modified result address;

(v) means for decreasing the magnitude of the stored modified field length characters by one unit;

(w) first timing means for reactivating means (e) through (n) and (e) through (v) for causing the operation thereof to be repeated with the new values of the modified field length characters and thereby cause each of the other characters of the shorter length of the first and second operands to be added, said adding means additionally being arranged for combining a stored carry indication with the addition of the next two operand characters added, thereby forming complete partial sum characters for storing in the result field;

(x) second timing means for reactivating means (j) through (p) and (p) through (v) for causing the operation thereof to be repeated if each of the characters of the first operand have been added but each of the characters of the second operand have not been added, said second timing means additionally being arranged for causing said adding means (s) to add a character zero to the characters of the second operand and combine therewith any stored carry indications until each of the characters of the second operand are combined with any carry and completely stored in the correct storage location of the memory means; and (y) third timing means for reactivating means (e) through (i) and (p) through (v) for causing the operation thereof to be repeated if each of the characters of the second operand have been added but each of the characters of the first operand have not been added, said third timing means additionally being arranged for causing said adding means (s) to add a character zero to the characters of the first operand and combine therewith any stored carry indications until each of the characters of the first operand are combined with any carry and completely stored in the correct storage location of the memory means.

14. In a variable field length digital computer for processing information composed of characters received from peripheral units which provide information a character at a time the arithmetic section therefor comprising:

(a) addressable memory means for storing variable field length operands and commands composed of characters, the commands having characters representing the addresses of end characters of first and second operands, the field length of said first and second operands, and the address for storage of an end character in a result field;

(b) command addressing means for selectively addressing the individual characters of the commands stored in the memory means, the command addressing means being characterized as selectively re-addressing at least the addresses of each command;

(c) means for reading out of the memory means the characters of commands addressed by the command addressing means;

(d) means for storing the field length characters of the same command;

(e) means for selectively modifying the magnitude of each stored field length character in a predetermined sequence, the modified field length characters representing values which combined with the operand and result end addresses form the addresses of the individual characters of corresponding operands and addresses of characters in the corresponding result field in a predetermined sequence defining the type of arithmetic operation to be performed;

(f) means for selectively and sequentially combining the end operand and result addresses read out of the memory means with the modified field length character and for forming modified addresses of the individual characters of corresponding operands stored in the memory means and modified addresses of characters in the corresponding result fields of the memory means;

(g) memory address means for storing the modified addresses in sequence as they are formed;

(h) means for reading out of the memory means the operand characters for processing specified by the stored modified operand addresses;

(i) means for concurrently storing a character of each of two operands being read out of the memory means;

(j) means for combining the two stored operand characters together and for forming a partial result character and any resulting carry;

(k) means for storing a signal corresponding to a carry from the combining means, said combining means further being responsive to a stored carry signal for selectively combining a carry with operand characters combined subsequent to the forming of the carry to form complete partial result characters;

(l) means for writing the partial result characters in the addresses of the memory means specified by the modified result addresses stored in the memory address means;

(m) electrical circuit means arranged to be responsive to a signal indicating a peripheral unit is concurrently applying an input character to the memory means for storage therein for momentarily interrupting the operation of the aforementioned means after an address stored in the memory address means has been used to address the memory means and before a new address has been stored in the memory address means;

(n) means for storing an input character address in the memory address means concurrently with the interruption of operation by the last mentioned means, the input character address specifying a memory location wherein such input character applied by a peripheral unit is to be stored; and (o) means for writing such input character applied by a peripheral unit in the memory location of the memory means specified by the input character address stored in the memory address means writing same during the momentary interruption of operation.

15. In a data processing system for processing information arranged in characters comprising:

(a) a peripheral unit for providing a series of information characters to be processed;

(b) a digital computer for processing information composed of characters the combination comprising:

(1) addressable memory means for storing valuable field length operands and commands composed of characters, the commands having characters representing the addresses of end characters of first and second operands, the field length of said first and second operands, and the address for storage of an end character of a result field;

(2) command addressing means for selectively addressing the individual characters of the commands stored in the memory means, the command addressing means being characterized as selectively re-addressing at least the addresses of each command;

(3) means for reading out of the memory means the characters of commands addressed by the command addressing means;

(4) means for storing the field length characters of the same command read out of the memory means;

(5) means for selectively modifying the magnitude of each stored field length character in a predetermined sequence, the modified field length characters representing values which combined with the operand and result end addresses form the addresses of the individual characters of corresponding operands and addresses of characters in the corresponding result field in a predetermined sequence defining the type of arithmetic operation to be performed;

(6) means for selectively and sequentially combining the end operand and result addresses read out the memory means with the modified field length character and for forming modified addresses of the individual characters of corresponding operands stored in the memory means and modified addresses of characters in the corresponding result fields of the memory means;

(7) memory address means for storing the modified addresses in sequence as they are formed;

(8) means for reading out of the memory means the operand characters for processing specified by the stored modified operand addresses;

(9) means for concurrently storing a character of each of two operands being read out of the memory means;

(10) means for combining the two stored operand characters together and for forming a partial result character and any resulting carry;

(11) means for storing a signal corresponding to a carry from the combining means, said combining means further being responsive to a stored carry signal for selectively combining a carry with operand characters combined subsequent to the forming of the carry to form complete partial result characters;

(12) means for writing the partial result characters in the addresses of the memory means specified by the modified result addresses stored in the memory address means;

(13) electrical circuit means connected for momentarily interrupting the operation of the aforementioned means concurrently with the provision of a character by the peripheral unit, the electrical circuit means being arranged for providing the interruption after an address stored in the memory address means has been used to address the memory means and before a new address has been stored in the memory address means;

(14) means for storing an input character address in the memory address means concurrently with the interruption of operation by the last mentioned means, the input character address specifying a memory location wherein the character provided by the peripheral unit is to be stored; and

(15) means for writing the character provided by the peripheral unit in the memory location of the memory means specified by the input character address stored in the memory address means during the momentary interruption of operation.

16. In a stored program digital computer the combination comprising:

(a) addressable memory means for storing characters of information and for storing and selectively reading out commands composed of at least one address and at least one field length signal, said memory means including means for repeatedly reading out said address in each of said commands, (b) means for storing the field length signal of a command and for selectively modifying same in a predetermined manner to form a plurality of different field length signals, and (c) means for combining said plurality of field length signals with the address of a command which is repeatedly read out of the memory means and for forming a plurality of different addresses of characters of information to be read out of the memory means.

17. In a stored program computer the combination comprising:

(a) memory means for storing and reading out information a character at a time and arranged for storing and reading out commands composed of at least two addresses and at least two field length signals associated with the two addresses, said memory means including means for repeatedly reading out the addresses of a command, (b) means for individually storing and selectively modifying in a predetermined manner the two field length signals of a command read out of the memory means and thereby form a plurality of different field length signals for each command, and (c) means for combining the plurality of field length signals with the corresponding addresses repeatedly read out of the memory means and for forming a plurality of different addresses of characters in the memory means.

18. In a stored program computer the combination comprising:

(a) memory means for storing and reading out information a character at a time and arranged for storing and reading out commands composed of at least two addresses and at least two field length signals associated with the two addresses, said memory means including means for repeatedly reading out the addresses of a command, (b) means for individually storing and selectively modifying in a predetermined manner the two field length signals of a command read out of the memory means and thereby form a plurality of different field length signals for each command.

(c) means for combining the plurality of field length signals with the corresponding addresses repeatedly read out of the memory means and for forming a plurality of different addresses of characters in the memory means, and (d) a single address register arranged for serially storing the addresses formed by the combining means one by one for use in addressing said memory means.

19. In a stored program computer the combination comprising:

(a) memory means for storing and reading out variable field length operands, a character at a time, and arranged for storing and reading out commands composed of at least two operand addresses and a result address and a field length signal for each of said operand addresses designating the length of the field of the corresponding operand, said memory means including means for repeatedly reading out the addresses of a command in a predetermined order, (b) means for individually storing and selectively modifying in a predetermined manner the two field length signals of a command readout of the memory means and thereby for a plurality of different field length signals for each command, (c) means for individually combining the operand addresses read out of the memory means with the corresponding plurality of field length signals, one at a time, and for forming a plurality of different addresses of operand characters in the memory means, (d) means for selectively combining the result address read out of the memory means with the two plurality of different field length signals in a predetermined manner and for forming a plurality of different result addresses in a result field in the memory means, and (e) addressing means for said memory comprising a single address register for storing the addresses formed by both said combining means one address at a time for use in addressing said memory means.

20. In a stored program computer the combination comprising:

(a) memory means for storing and reading out variable field length operands, a character at a time, and arranged for storing and reading out commands composed of at least two operand addresses and a field length signal for each of said addresses designating the length of the field of the corresponding operand, said money means including means for repeatedly reading out said addresses, one at a time, in a predetermined order according to the command being executed, (b) means for individually storing and selectively modifying the two field length signals of a command read out of the memory means and thereby form a plurality of different field length signals for each command which when combined with the corresponding addresses form the addresses of each of the characters of a corresponding operand in a predetermined order according to the command being read, (c) means for individually combining each operand address as it is read out of the memory means with one of the plurality of the corresponding field length signals and for forming an address of an operand character in the memory means, (d) addressing means for said memory comprising a single address register for storing the addresses formed by said combining means one at a time for use in addressing said memory means, and (e) means for reading the operand character out of the memory means designated by each of said stored addresses after each address is formed and stored and before the next reading of an address by said memory means.

21. In a variable field length data processor the combination comprising memory means for storing groups of bits and for storing instructions at least some of which comprise two addresses identifying two operands among said groups of bits which operands may be of different lengths and further comprising a signal for each of said two operand addresses which designates the number of groups in the corresponding operand, means for reading out one of said instructions from said memory means, and means for executing such instruction including means responsive to both the field length signals therein for processing the designated number of groups of each operand identified by the addresses therein.

22. In a variable field length data processor the combination comprising memory means for storing groups of bits and for storing instructions at least some of which comprise two addresses identifying an end of two operands among said groups of bits which operands may be of different lengths and further comprising a signal corresponding to each of said two operand addresses which designates the number of groups in the corresponding operand, means for reading out one of said instructions from said memory means, and means for executing such instruction including means for operating on the operands identified by the addresses therein beginning with an end of each operand and progressing through the number of groups of bits of each operand designated by the corresponding field length signal.

23. In a variable field length data processor the combination comprising memory means for storing groups of bits and for storing instructions at least some of which comprise two addresses identifying two operands among said groups of bits which operands may be of different lengths and further comprising a signal corresponding to each of said two operand addresses which designates the number of groups in the corresponding operand, means for reading out one of said instructions from said memory means, means for individually storing each field length signal, means for processing the operands specified by the instruction read from said memory means and including means for processing the number of groups of each operand specified by the corresponding field length signal and means for modifying each stored field length signal as a group of bits of the corresponding operand is operated on causing each field length storing means to store a signal indicating the number of groups of each operand left to be operated on, and thereby causing an indication for the processing means when all groups of bits in each operand are operated on.

24. In a variable field length data processor the combination comprising memory means for storing a series of groups of bits and for storing instructions at least some of which comprise two addresses identifying two operands among said groups of bits which operands may be of different lengths and further comprising at least one signal corresponding to each of said at least two operand addresses which designates the number of groups in the corresponding operand, means for reading out one of said instructions from said memory means, first and second register means for individually storing values corresponding to the field length signals of the instruction read from the memory means, and means for executing such instructions on the operands identified by the addresses therein, means associated with each register means for causing the value in the corresponding register means to be modified a predetermined amount as the groups in the corresponding operand are operated on and thereby provide an indication of the number of groups left to be operated on in each operand, said executing means operating under control of said register means for operating on groups of bits in series, one by one, until all groups in the corresponding operand are operated on as indicated by the content of the corresponding register means.

25. In a variable field length data processor the combination comprising memory means for storing variable field length operands composed of a series of groups of bits and for storing instructions at least some of which comprise two addresses identifying two operands in said groups of bits which may be of different lengths and further comprising at least one signal corresponding to each of said two operand addresses which designates the number of groups in the corresponding operand, means for reading out one of said instructions from said memory means, first and second register means for individually storing values corresponding to the field length signals of the instruction read from the memory means, means for serially operating on the groups of the two operands identified by the addresses in such instruction, and means associated with each register means for causing the value in the corresponding register means to be modified a predetermined amount as each group of bits of the corresponding operand are operated on and thereby provide an indication of the number of groups left to be operated on in each operand, said operating means being operative for progressing through said series of groups of bits, one by one, for each instruction terminating such progressing for each operand when the register means indicates all groups in the corresponding operand have been operated on.

26. In a variable field length data processor the combination comprising memory means for storing groups of bits and for storing instructions at least some of which comprise two addresses identifying two operands among said groups of bits which operands may be of different lengths and further comprising at least one signal corresponding to each of said at least two operand addresses which designates the number of groups in the corresponding operand, means for reading out one of said instructions from said memory means, first and second register means for individually storing values corresponding to the field length signals of the instruction read from the memory means, means for serially operating on the groups of the two operand identified by the addresses in the instruction read from the memory means, means associated with each register means for causing the value in the corresponding register means to be modified a predetermined amount toward a reference value as the groups in the corresponding operand are operated on and thereby provide an indication of the number of groups left to be operated on in each operand, and means associated with said register means for indicating when the value in one of said register means reaches said reference value thereby indicating all groups in the corresponding operand have been operated on, said operating means being operative to terminate operations on the operand which has had all groups combined upon formation of said indication.

27. In a variable field length data processor the combination comprising memory means for storing variable field length operands composed of groups of bits and for storing instructions at least some of which comprise two addresses identifying two operands which may be of different lengths and further comprising at least one signal corresponding to each of said two operand addresses which designates the number of groups in the corresponding operand, means for reading out one of said instructions from said memory means, first and second counting means for individually storing values corresponding to the field length signals of the instruction read from the memory means, means for operating on the groups of the two operands designated by the addresses in the instruction read from the memory means one by one in a predetermined order, means associated with each counting means for causing the value in the corresponding counting means to be counted by one count toward a reference value upon operation on a group of a corresponding operand, and means adapted for indicating when the value in each of said register means reaches said reference value thereby indicating all groups in both operands have been operated on, said operating means being operative to terminate said operation on the operands specified by the read instruction upon formation of said indication.

28. In a variable field length data processor the combination comprising memory means for storing variable field length operands composed of groups of bits and for storing add instructions comprising two addresses identifying at least two operands which may be of different lengths and further comprising at least one signal corresponding to each of said two operand addresses which designates the number of groups in the corresponding operand, means for reading out one of said add instructions from said memory means, first and second register means for individually storing values corresponding to the field length signals of the add instruction read from the memory means, means for combining the two operands identified by the addresses in such instruction, said combining means being operative for combining together one group of each operand at a time in a predetermined order, means associated with each register means for causing the value in the corresponding register means to be modified toward a reference value as the corresponding operand groups are combined and thereby provide an indication of the groups in the corresponding operands not yet combined, and means adapted for indicating the first of said register means to contain a value equal to said reference value thereby indicating all groups in the corresponding operand has been combined, said combining means being operative to terminate the combining of the groups of the operand which has been completely combined on formation of said indication.

29. In a variable field length data processor the combination comprising memory means for storing groups of bits and for storing instructions at least some of which comprise two addresses identifying the storage location of an end group of bits of each of two operands among said groups of bits which operands may be of different lengths and further comprising a signal for each of said two operand addresses which designates the number of groups in the corresponding operand, means for reading an instruction from said memory means, and means for obtaining the operands from said memory means identified by the addresses in such instruction and for processing such operands starting with an end group of bits of each operand and continuing for the number of groups of bits for each operand designated by the corresponding field length signal.

30. In a variable field length data processor the combination comprising memory means for storing groups of bits and for storing instructions at least some of which comprise two addresses identifying the storage location of an end group of bits of each of two operands among said groups of bits which operands may be of different lengths and further comprising a signal for each of said two operand addresses which designates the number of groups in the corresponding operand, means for reading an instruction from said memory means, register means for each operand for storing a group of bits of the corresponding operand, means for processing such stored groups of bits, means for obtaining the operands from said memory means identified by the addresses in such instruction and for storing the groups of bits in the corresponding register means starting with an end group of bits of each operand and continuing through such groups of bits in series terminating when the number of groups of bits for each operand designated by the corresponding field length signal is stored.

31. In a variable field length data processor the combination comprising memory means for storing groups of bits and for storing instructions at least some of which comprise two addresses identifying the storage location of an end group of bits of each of two operands among said groups of bits which operands may be of different lengths and further comprising a signal for each of said two operand addresses which designates the number of groups in the corresponding operand, means for reading an instruction from said memory means, register means for storing parts of such instruction including register means for storing each field length signal, means for processing groups of bits provided thereto and means for reading the operands identified by the addresses in such instruction and for providing same to said processing means in a series starting with an end group of bits of each operand and terminating when the number of groups of bits for each operand designated by the corresponding stored field length signal are processed.

32. In a variable field length data processor the combination comprising memory means for storing groups of bits and for storing instructions at least some of which comprise two addresses identifying the storage location of an end group of bits of each of two operands among said groups of bits which operands may be of different lengths and further comprising a signal for each of said two operand addresses which designates the number of groups in the corresponding operand, means for reading an instruction from said memory means, register means for storing parts of such instruction including register means for storing each field length signal, register means for each operand for storing a group of bits of each operand, means for processing the groups of bits stored in the operand register means, and means for reading the operands identified by the addresses in such instruction including means for storing the groups of bits of the operands from the memory means in a series starting with an end group of bits of each operand terminating when the number of groups of bits for each operand designated by the corresponding stored field length signal are precessed.

33. In a variable field length data processor the combination comprising memory means for storing groups of bits and for storing instructions at least some of which comprise two addresses identifying the storage location of an end group of bits of each of two operands among said groups of bits which operands may be of different lengths and further comprising a signal for each of said two operand addresses which designates the number of groups in the corresponding operand, means for reading an instruction from said memory means, register means for storing parts of such instruction including register means for storing each field length signal, means for processing groups of bits provided thereto, means for modifying each stored field length signal as the groups of bits of the corresponding operand are processed and thereby cause a signal to be stored in each register means indicative of the number of groups of bits in each operand remaining to be processed, and means for reading the operands identified by the addresses in such instruction and for providing groups of bits from said memory means to said processing means in a series starting with an end group of bits of each operand and terminating when the content of the register means indicates all groups of bits of the corresponding operand are processed.

No references cited.

ROBERT C. BAILEY, *Primary Examiner.*

R. ZACHE, *Assistant Examiner.*

UNITED STATES PATENT OFFICE
CERTIFICATE OF CORRECTION

Patent No. 3,274,558 September 20, 1966

Richard Stanton Sharp et al.

It is hereby certified that error appears in the above numbered patent requiring correction and that the said Letters Patent should read as corrected below.

Column 9, line 20, for "cock" read -- clock --; column 16, lines 5 and 9, for "$A_f$+15", each occurrence, read -- $A_f \neq 15$ --; line 8, for "$B_f$+15" read -- $B_f \neq 15$ --; column 21, line 32, after "dressed" insert -- using the address --; column 23, line 23, strike out "pulses cause the beginning address of the A" and insert instead -- modified B field length character stored in the B --; column 38, line 65, for "(b)" read -- (h) --; column 47, line 2, for "money" read -- memory --.

Signed and sealed this 29th day of August 1967.

(SEAL)
Attest:

ERNEST W. SWIDER
Attesting Officer

EDWARD J. BRENNER
Commissioner of Patents